US012581224B2

(12) United States Patent
Deschamps et al.

(10) Patent No.: US 12,581,224 B2
(45) Date of Patent: Mar. 17, 2026

(54) ELECTRONIC DEVICE WITH A LAYERED SEAL

(71) Applicant: Apple Inc., Cupertino, CA (US)

(72) Inventors: Daniela M. Deschamps, Palo Alto, CA (US); Dylan L. Vassberg, San Jose, CA (US)

(73) Assignee: APPLE INC., Cupertino, CA (US)

( * ) Notice: Subject to any disclaimer, the term of this patent is extended or adjusted under 35 U.S.C. 154(b) by 229 days.

(21) Appl. No.: 18/452,450

(22) Filed: Aug. 18, 2023

(65) Prior Publication Data

US 2024/0334102 A1 Oct. 3, 2024

Related U.S. Application Data

(60) Provisional application No. 63/492,411, filed on Mar. 27, 2023.

(51) Int. Cl.

| | |
|---|---|
| ***H04R 1/02*** | (2006.01) |
| ***G04G 17/04*** | (2006.01) |
| ***G04G 17/08*** | (2006.01) |
| ***H04R 1/44*** | (2006.01) |

(52) U.S. Cl.

CPC ............. *H04R 1/023* (2013.01); *G04G 17/04* (2013.01); *G04G 17/08* (2013.01); *H04R 1/44* (2013.01); *H04R 2400/11* (2013.01)

(58) Field of Classification Search

CPC ...... H04R 1/023; H04R 1/44; H04R 2400/11; G04G 17/04; G04G 17/08

See application file for complete search history.

(56) References Cited

U.S. PATENT DOCUMENTS

2025/0098092 A1 * 3/2025 Lin ........................ G04G 17/08

* cited by examiner

*Primary Examiner* — Mark Fischer

(74) *Attorney, Agent, or Firm* — Dorsey & Whitney LLP

(57) ABSTRACT

An electronic device includes a multi-layer seal and a speaker mesh attached to a speaker frame. In at least one example, the cavity is defined by the sidewall and the display cover with the cavity in fluid communication with an external environment through the gap. In some examples, an electronic device includes a housing sidewall defining an opening; an electronic positioned adjacent to the opening; and a seal between the electronic and the first opening, the seal including a perforated support; a first adhesive layer on the perforated support; a first membrane layer on the first adhesive layer; a second adhesive layer on the first membrane layer; and a second membrane layer on the second adhesive layer.

19 Claims, 31 Drawing Sheets

ELECTRONIC DEVICE WITH A LAYERED SEAL

CROSS-REFERENCE TO RELATED APPLICATION(S)

This claims priority to U.S. Provisional Patent Application No. 63/492,411, filed 27 Mar. 2023, and entitled "Electronic Device," the entire disclosure of which is hereby incorporated by reference.

FIELD

The described embodiments relate generally to electronic devices, such as wearable electronic devices. More particularly, the present embodiments relate to improved seals, improved speaker frames, and improved methods for attaching mesh to speaker frames, which provide wearable electronic devices with improved ingress protection, improved durability, and the like.

BACKGROUND

Electronic devices are increasingly being designed with device portability in mind. This may allow users to use these devices in a wide variety of situations and environments. In the context of wearable devices, these devices can be designed to include many different functionalities and to be operated in many different locations and environments. The components of an electronic device, for example, the processors, memory, antennas, display, and other components can partially determine a level of performance of the electronic device. Further, the arrangement of these components with respect to one another in the device can also determine the level of overall performance of the electronic device.

Continued advances in electronic devices and their components have enabled considerable increases in performance. Existing components and structures for electronic devices can, however, limit the levels of performance of such devices. For example, while some components can achieve high levels of performance in some situations, the inclusion of multiple components in devices sized to enhance portability can limit the performance of the components, and thus, the performance of the device. Consequently, further tailoring and arrangement of components for electronic devices to provide additional or enhanced functionality, without introducing or increasing undesirable device properties, can be desirable.

SUMMARY

According to some aspects of the present disclosure, an electronic device includes a housing sidewall defining an opening; an electronic adjacent to the opening; and a seal positioned between the electronic and the opening. The seal can include a perforated support; a first adhesive layer on the perforated support; a first membrane layer on the first adhesive layer; a second adhesive layer on the first membrane layer; and a second membrane layer on the second adhesive layer.

In some examples, the electronic device can further include a third adhesive layer on the second membrane layer; and a third membrane layer on the third adhesive layer. In some examples, the first membrane and the second membrane can have waterproof ratings of at least 10 bar. In some examples, the third membrane can have a waterproof rating of at least 5 bar and less than the waterproof rating of each of the first membrane and the second membrane. In some examples, the third membrane can have a thickness greater than thicknesses of each of the first membrane and the second membrane.

In some examples, the first adhesive and the second adhesive can include slots extending in a direction parallel to longitudinal axes of the first adhesive and the second adhesive. In some examples, the first adhesive and the second adhesive can include slots extending in a direction parallel to lateral axes of the first adhesive and the second adhesive. In some examples, the first adhesive and the second adhesive further can include slots extending in a direction parallel to longitudinal axes of the first adhesive and the second adhesive. In some examples, the slots of one of the first adhesive or the second adhesive can have lengths greater than the slots of the other of the first adhesive or the second adhesive.

In some examples, the first membrane can have a waterproof rating of at least 10 bar. In some examples, the second membrane can have a waterproof rating of at least 5 bar and less than the waterproof rating of the first membrane. In some examples, the second membrane can have a thickness greater than a thickness of the first membrane.

In some examples, the first membrane and the second membrane can have waterproof ratings of at least 10 bar. In some examples, the first membrane and the second membrane can have the same thicknesses.

According to some examples, an electronic device includes a housing sidewall; a speaker frame attached to the housing sidewall; a speaker mesh attached to the speaker frame; a weld including a first material attaching the speaker mesh to the speaker frame; and an adhesive attaching the speaker mesh to the speaker frame. The adhesive can at least partially surround the weld. The adhesive can include a second material different from the first material.

In some examples, the speaker frame can define a first speaker opening; and a second speaker opening. In some examples, the speaker mesh can cover the first speaker opening and the second speaker opening.

In some examples, the adhesive can be C-shaped and can encircle at least three sides of a speaker opening of the speaker frame. In some examples, the adhesive can be D-shaped and can encircle a speaker opening of the speaker frame. In some examples, the adhesive can include a continuous material surrounding the weld and a second weld attaching the speaker mesh to the speaker frame.

In some examples, the adhesive can include an epoxy. In some examples, the housing sidewall can cover the weld and the adhesive. In some examples, a diameter of the adhesive can be greater than a diameter of the weld.

According to some examples, an electronic device includes a housing sidewall; a speaker frame attached to the housing sidewall, the speaker frame defining a first speaker opening and a second speaker opening; a speaker mesh attached to the speaker frame covering the first speaker opening and the second speaker opening; a weld including a first material attaching the speaker mesh to the speaker frame; and an epoxy adhesive attaching the speaker mesh to the speaker frame. The epoxy adhesive can at least partially surround the weld; the epoxy adhesive can be more flexible than the weld; and the adhesive can include a second material different from the first material.

In some examples, the housing sidewall can define an opening. In some examples, the electronic device can further include a processor positioned adjacent to the opening; and a seal between the processor and the opening. In some examples, the seal can include a perforated support; a first adhesive layer on the perforated support; a first membrane layer on the first adhesive layer; a second adhesive layer on the first membrane layer; and a second membrane layer on the second adhesive layer.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure generally relates to electronic devices. More particularly, the present disclosure relates to wearable electronic devices. The wearable electronic devices of the present disclosure include tailored arrangements of components to provide additional or enhanced functionality, without introducing or increasing undesirable device properties or performance. In this way, more functionality and componentry can be included in wearable devices for user's to wear and operate in any condition or activity without limiting the functionality and durability of the devices. In some example, the wearable electronic devices can include improved seals, improved speaker frames, and improved methods for attaching mesh to speaker frames. These features can provide wearable electronic devices with improved ingress protection, improved durability, and the like.

Specific examples and embodiments of electronic devices, including wearable electronic devices, are discussed below with reference to FIGS. 1A through 13B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1A:
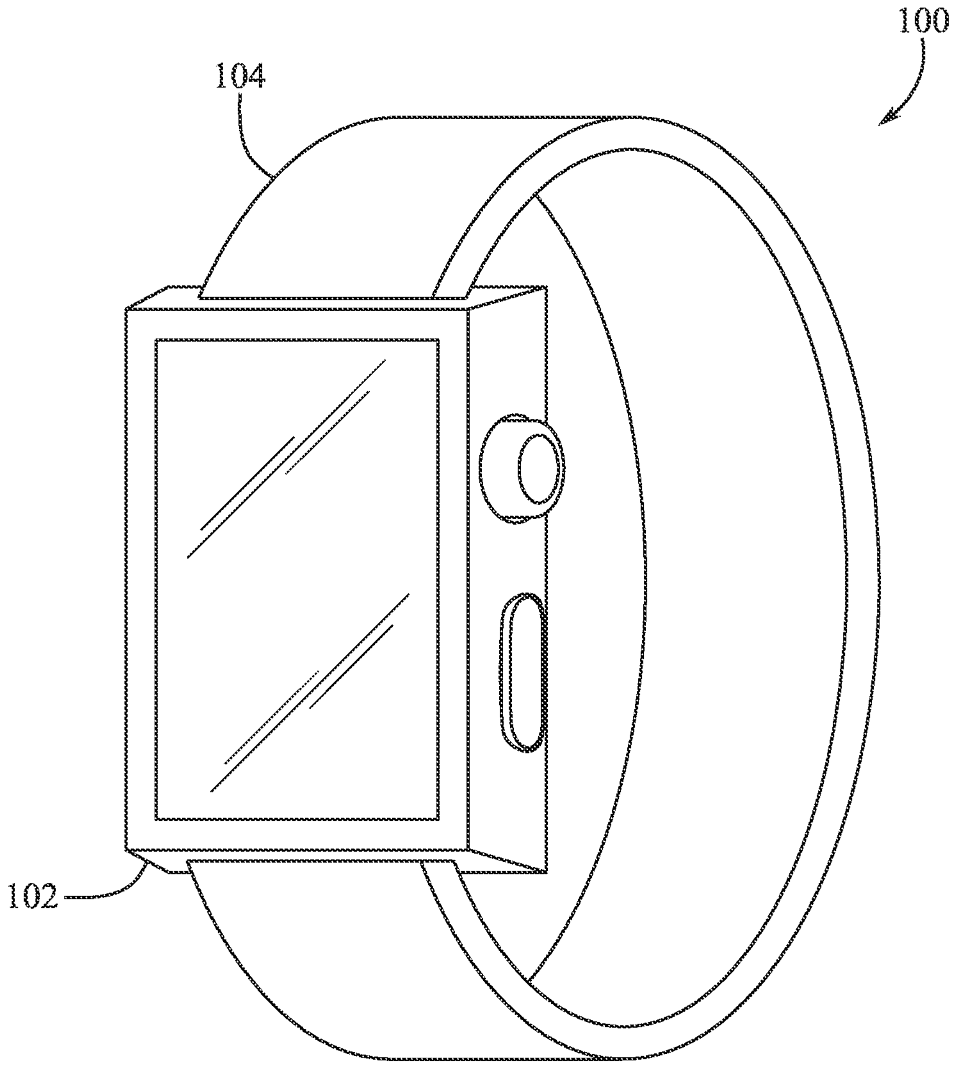
FIG. 1A is a perspective view of a wearable electronic device.

FIG. 1A shows an example of an electronic device 100. The electronic device shown in FIG. 1A is a watch, such as a smartwatch. The smartwatch of FIG. 1A is merely one representative example of a device that can be used in conjunction with the systems and methods disclosed herein. The electronic device 100 can correspond to any form of wearable electronic device, a portable media player, a media storage device, a portable digital assistant ("PDA"), a tablet computer, a computer, a mobile communication device, a GPS unit, a remote control device, or another electronic device. The electronic device 100 can be referred to as an electronic device or a consumer device. In some examples, the electronic device 100 can include a housing 102 that can carry operational components, for example, in an internal volume at least partially defined by the housing 102. The electronic device 100 can also include a strap 104, or other retaining component that can secure the electronic device 100 to a body of a user as desired. Further details of the electronic device 100 are provided below with reference to FIG. 1B.

Figure 1B:
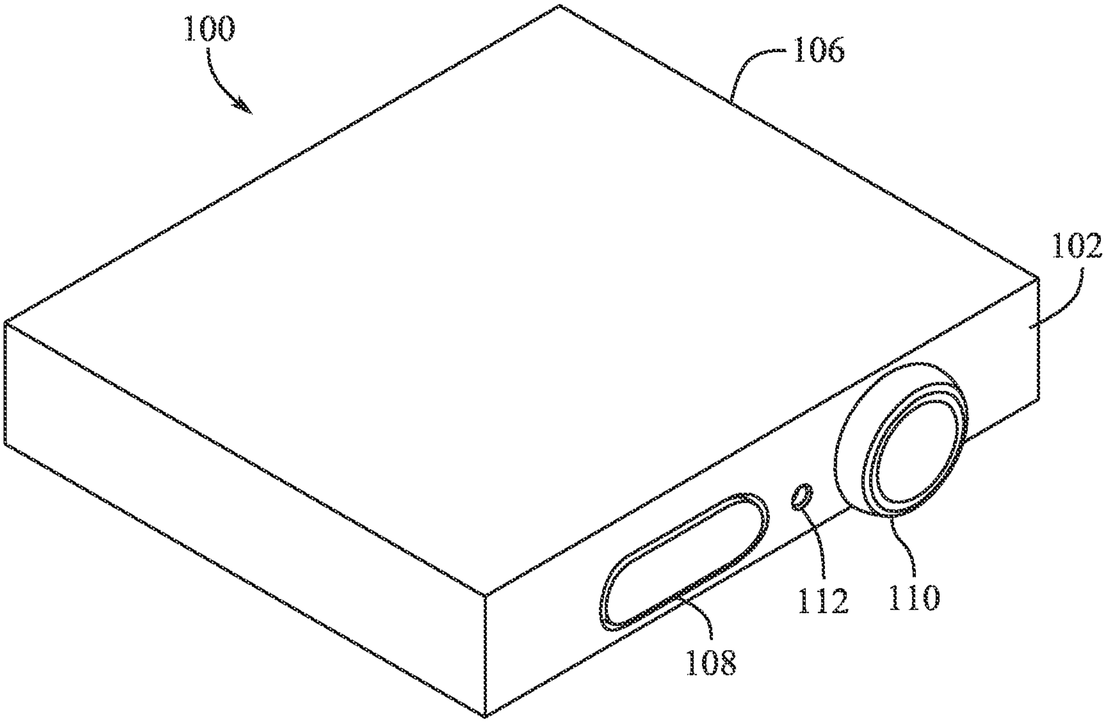
FIG. 1B is a perspective top view of a portion of the wearable electronic device.

FIG. 1B illustrates the electronic device 100, for example a smartwatch, that can be substantially similar to and can include some or all of the features of the devices described herein, including the electronic device 100 shown in FIG. 1A, except that the strap 104 has been omitted in FIG. 1B. The electronic device 100 can include a housing 102 and a display assembly 106 attached to the housing 102. The housing 102 can substantially define at least a portion of an exterior surface of the electronic device 100.

The display assembly 106 can include a glass, a plastic, or any other substantially transparent exterior layer, material, component, or assembly. The display assembly 106 can include multiple layers, with each layer providing a unique function, as described herein. Accordingly, the display assembly 106 can be, or can be a part of, an interface component. The display assembly 106 can define a front exterior surface of the device 100 and, as described herein, this exterior surface can be considered an interface surface. In some examples, the interface surface defined by display assembly 106 can receive inputs, such as touch inputs, from a user.

In some examples, the housing 102 can be a substantially continuous or unitary component and can define one or more openings to receive components of the electronic device 100. In some examples, the device 100 can include input components such as one or more buttons 108 and/or a crown 110 that can be disposed in the openings. In some examples, a material can be disposed between the buttons 108 and/or crown 110 and the housing 102 to provide an airtight and/or watertight seal at the locations of the openings. The housing 102 can also define one or more openings or apertures, such as aperture 112 that can allow for sound to pass into or out of the internal volume defined by the housing 102. For example, the aperture 112 can be in communication with a microphone component disposed in the internal volume. In some examples, the housing 102 can define or include a feature, such as an indentation to removably couple the housing 102 and a strap or retaining component.

Figure 1C:
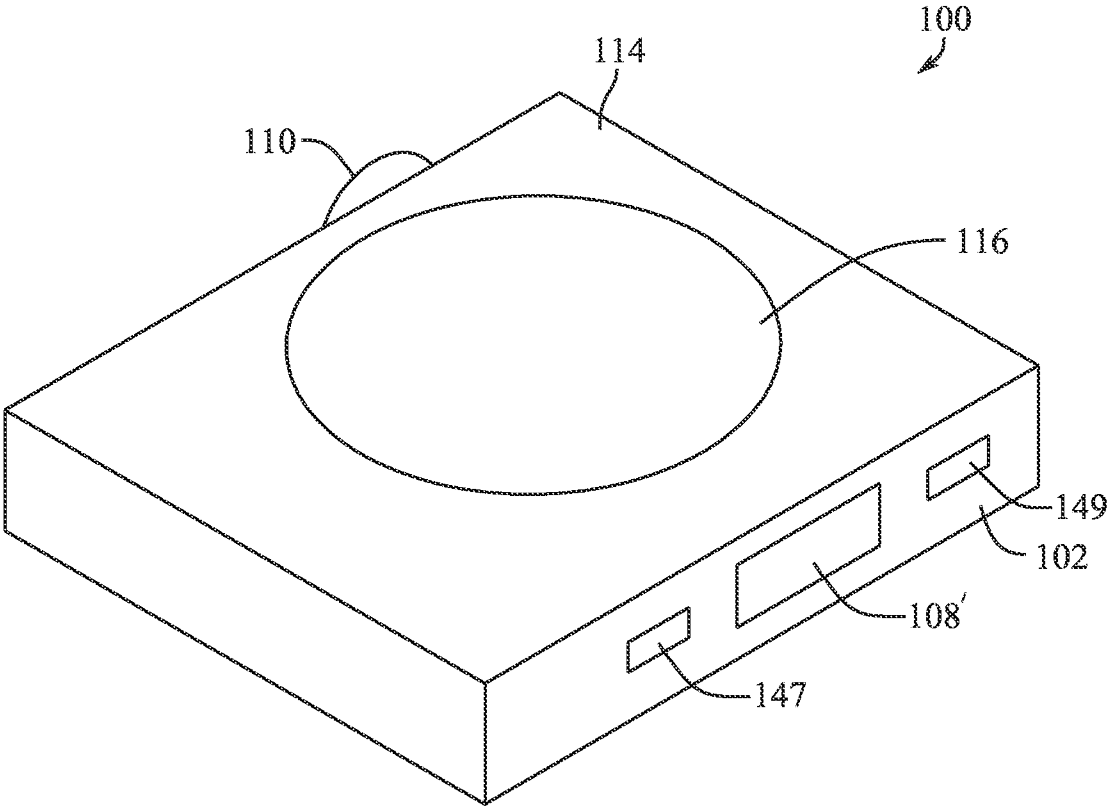
FIG. 1C is a perspective bottom view of a portion of the wearable electronic device.

FIG. 1C shows a bottom perspective view of the electronic device 100. The device 100 can include a back cover 114 that can be attached to the housing 102, for example, opposite the display assembly 106. The back cover 114 can include ceramic, plastic, metal, or combinations thereof. In some examples, the back cover 114 can include an at least partially electromagnetically transparent component 116. The electromagnetically transparent component 116 can be transparent to any desired wavelengths of electromagnetic radiation, such as visible light, infrared light, radio waves, or combinations thereof. In some examples, the electromagnetically transparent component 116 can allow sensors and/or emitters disposed in the housing 102 to communicate with the external environment. Together, the housing 102, display assembly 106 and back cover 114 can substantially define an internal volume and an external surface of the device 100.

In at least one example, as shown in FIG. 1C, the housing 102 can define a second side opposite a first side shown in FIG. 1B. In such an example, the electronic device 100 can include a first speaker vent 149, a second speaker vent 147, and a button 108' disposed between the first speaker vent 149 and the second speaker vent 147. The first speaker vent 149 and the second speaker vent 147 can provide fluid communication from a common speaker volume behind one or more speakers and the housing 102 (e.g., within an internal volume defined by the housing 102) to the external environment. The button 108' can be disposed between the first speaker vent 149 and the second speaker vent 147 to save space and provide a compact design without interrupting the functionality of the one or more speakers communicating with the external environment through the first speaker vent 149 and the second speaker vent 147.

As noted above, portable and wearable electronic devices can be designed to be used in many different environments and during any kind of activity throughout a user's day. For example, wearable electronic watches, headphones, and phones can be carried by a user during exercise, sleep, driving, biking, hiking, swimming, diving, outside in the rain, outside in the sun, and so forth. Wearable electronic devices described herein are configured to withstand the varied and often harsh conditions of various environments, including changing environments, wet environments, and high-impact environments. Wet environments can include wearing devices in the rain or when submerged during bathing or swimming, for example. High-impact environments can include wearing devices while cliff jumping, for example.

Examples of electronic devices disclosed herein include components, features, arrangements, and configurations that resist damage, corrosion, and the like due to exposure to varied environments, such as moisture, impacts, and the like. Some aspects of devices described herein can include gaps between components, apertures, or other openings through which moisture, water, other fluids, and the like could enter. In some examples, seals can be included to prevent such moisture from entering into the internal volume of the device where sensitive electronic component could be damaged thereby. In addition, the gaps, apertures, or openings can be susceptible to damage, such as from impacts with fluids, objects, or the like. In some examples, attachment mechanisms may be provided for various components that prevent damage to the components from being sustained by impacts and the like. For example, an elastic adhesive can be applied over welds to improve attachment of various components and aid the components from withstanding impacts.

Figure 2A:
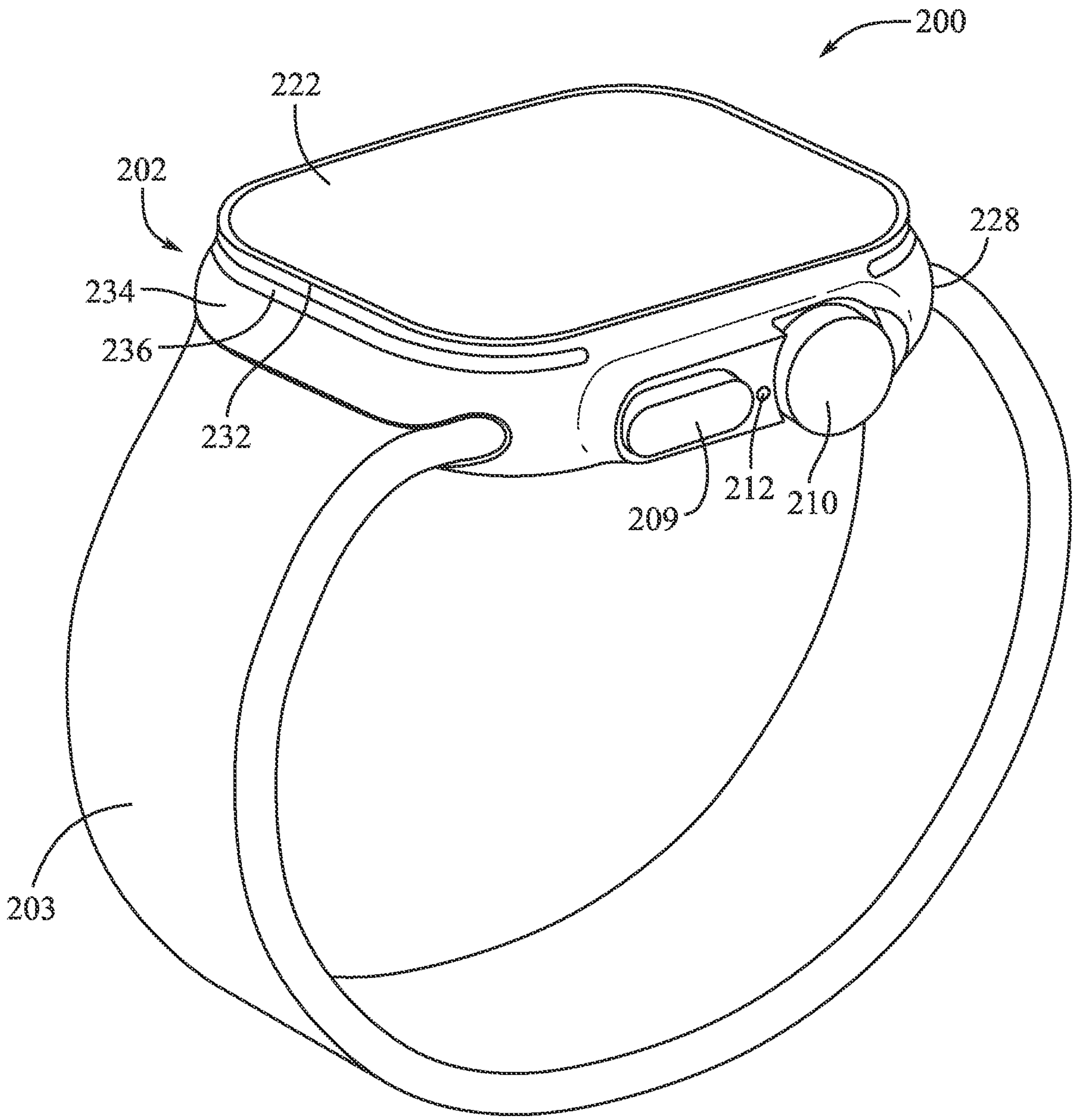
FIG. 2A is a perspective front view of a wearable electronic device.
Figure 2B:
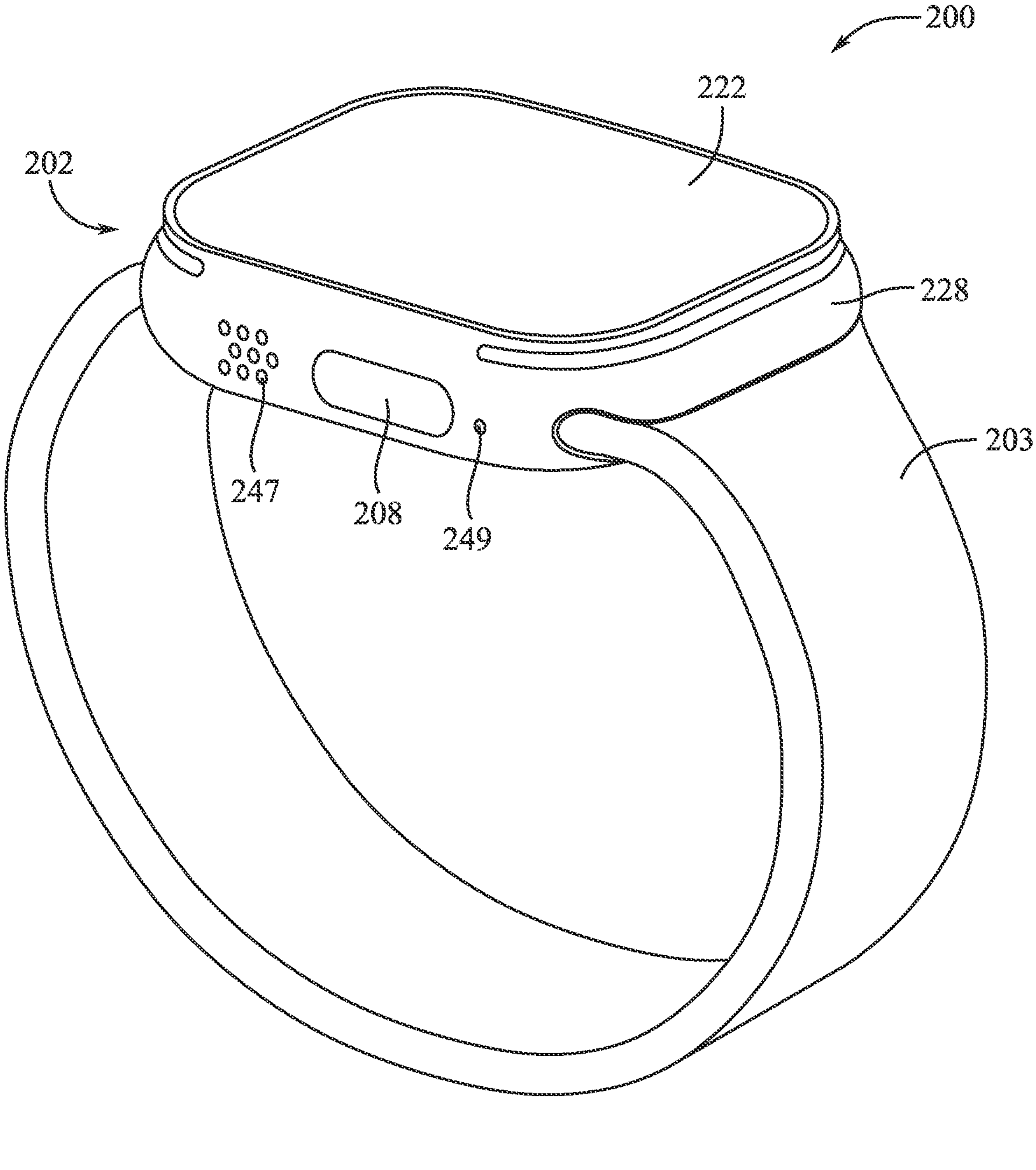
FIG. 2B is a perspective rear view of a wearable electronic device.

Along these lines, FIGS. 2A and 2B show right and left perspective views, respectively, of an example of a wearable electronic device 200 including a housing 202 including sidewalls 228 defining an opening in which the display cover 222 is disposed. The sidewalls can include an upper portion 232 defining an upper peripheral edge surrounding the display cover 222, a lower portion 234, and a middle portion 236 disposed between the upper portion 232 and the lower portion 234. The wearable electronic device 200 can also include a securement strap 203 configured to secure the wearable electronic device 200 to an appendage of the user. In at least one example, the sidewalls 228 of the housing 202 can define an upper peripheral edge of the wearable electronic device 200 surrounding the display cover 222.

In at least one example, the display cover 222 defines a top surface disposed in a plane. The plane can be flush with or set below the upper peripheral edge of the sidewalls 228. In this way, when the wearable electronic device 200 comes into contact with a surface or object at or near the upper surface of the display cover 222 and/or the upper peripheral edge of the sidewalls 228, contact and potential damage to the display cover 222 can be reduced. In one example, the display cover 222 is set flush with or below the upper peripheral edges of the sidewalls 228 to protect the display cover 222 from damage.

In at least one example, as shown in FIG. 2A, the sidewalls 228 can define a first side of the wearable electronic device 200 having a recessed feature in which a crown 210 is positioned. The crown 210 can be a part of a turn dial button or other functional knob configured to be manipulated by the user. The crown 210 can be disposed in the recessed portion, as noted above, such that first side of the sidewalls 228 extend outward and at least partially around the crown 210. In this way, contacts and bumps against of other objects against the first side of the sidewall 228 during use can contact the sidewall 228 without pressing or turning the crown 210. In this way, the recessed portion of the first side of the sidewalls 228 prevents inadvertent manipulation of the crown 210. The button 209 shown in FIG. 2A can also be at least partially surrounded by an outwardly extending portion of the sidewall 228, such that the button 209 is disposed within a recess thereof, to protect the button 209 form inadvertent contacts.

In at least one example, as shown in FIG. 2B, the sidewalls 228 can define a second side opposite the first side shown in FIG. 2A. In such an example, the wearable electronic device 200 can include a first speaker vent 249, a second speaker vent 247, and a button 208 disposed between the first speaker vent 249 and the second speaker vent 247. The first speaker vent 249 and the second speaker vent 247 can provide fluid communication from a common speaker volume behind one or more speakers and the sidewall 228 (e.g., within an internal volume defined by the sidewalls 228) to the external environment. The button 208 can be disposed between the first speaker vent 249 and the second speaker vent 247 to save space and provide a compact design without interrupting the functionality of the one or more speakers communicating with the external environment through the first speaker vent 249 and the second speaker vent 247.

Figure 2C:
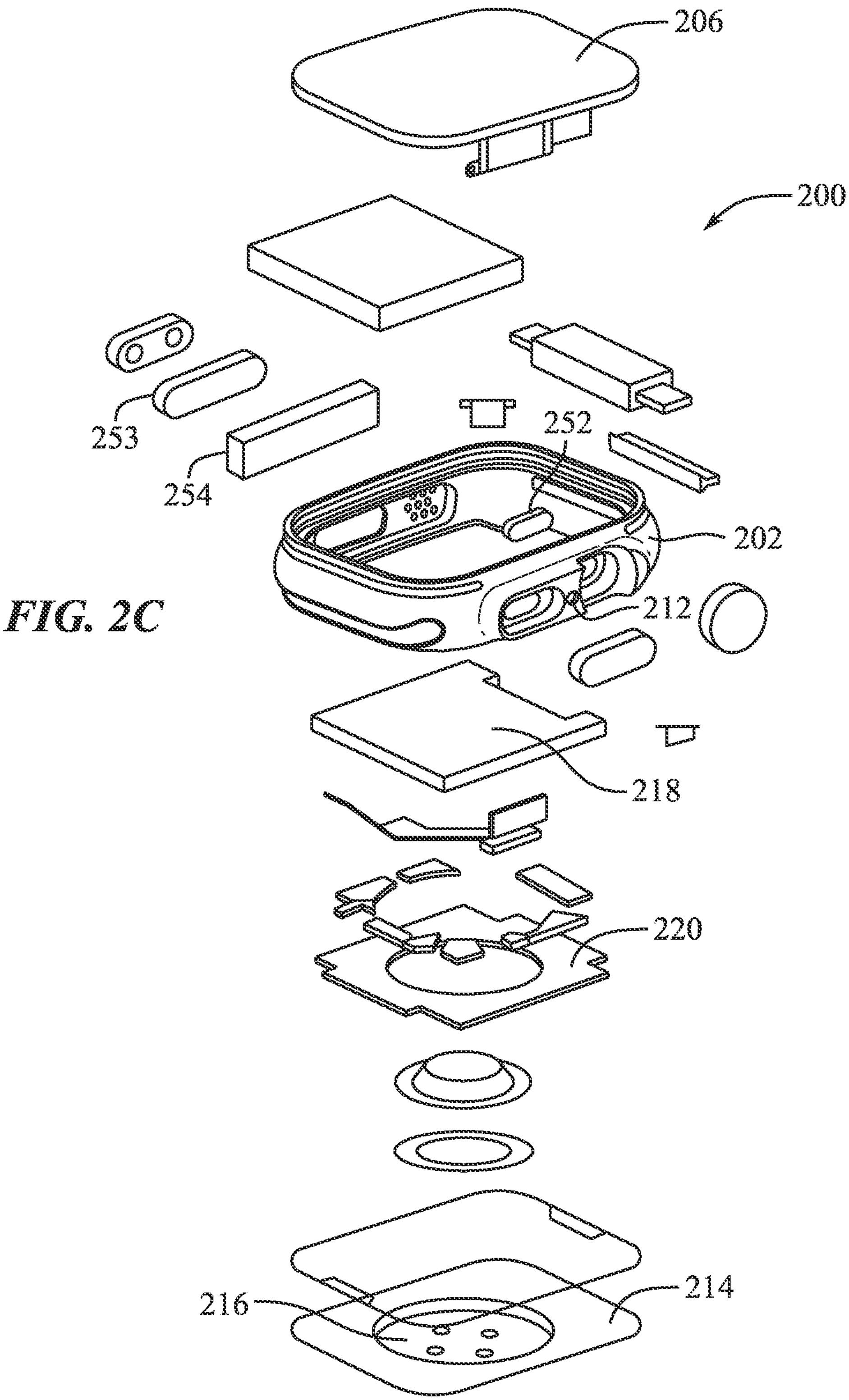
FIG. 2C is an exploded view of a wearable electronic device.

FIG. 2C illustrates an exploded view of an example of a wearable electronic device 200, which can be a portion of a wearable electronic watch or other wearable electronic device. The wearable electronic device 200 includes a display assembly 206, a housing 202, a back cover 214, and an electromagnetically transparent component 216. The exploded view of FIG. 2C illustrates various internal components that may be disposed within an internal volume defined by the housing 202, the back cover 214, the electromagnetically transparent component 216, and the display assembly 206. For example, the wearable electronic device 200 can include one or more printed circuit boards (PCBs) 218, and one or more antenna components 220, one or more seals 252, 253, a speaker frame 254, electrical connectors and flexes, buttons, seals, gaskets, memory components, processors, sensors, dials, batteries, and so forth.

The seals 252, 253 can provide environmental seals against external moisture, debris, and the like, while allowing air flow through the seals 252, 253. The seals 252, 253 can include two or more membrane layers disposed over a perforated support. Heat-activated film adhesive layers ("HAF layers") can be provided between each of the membrane layers, and between the membrane layers and the perforated support. The membrane layers may include multiple layers of the same materials having the same thicknesses, multiple layers of different materials having the same or different thicknesses, or the like. Individual membrane layers can be configured to provide different levels of water-protection. For example, in some examples, a first membrane layer can provide water-protection for pressures up to 5 bar (or greater than about 5 bar), and a second membrane layer can provide water-protection for pressures up to 10 bar (or greater than about 10 bar). In some examples, an outermost membrane layer can be a sacrificial layer, while inner membrane layers are included to provide desired water-protection. In some examples, an outermost membrane layer can provide protection from mechanical damage, while the inner membrane layers can provide protection from water. The HAF layers can include different configurations of holes, which can balance air flow, support, and the like for the membrane layers. The seals 252, 253 can be provided to protect internal components (also referred to as electronics) of the wearable electronic device 200 from damage caused by debris, water, and the like, while allowing air, sound, and the like to flow through the seals 252, 253. The seals 252, 253 may be used adjacent to various openings, apertures, and the like to protect internal components/electronics of the wearable electronic device 200, such as speakers, microphones, processors, and the like, while balancing pressure throughout the device. Additional details of the seals 252, 253 are discussed below with respect to FIGS. 3A through 9E.

The speaker frame 254 can support the one or more speakers within the internal volume defined by the sidewalls 228 and at least partially define the speaker volume. A speaker mesh can be attached to the speaker frame 254 over the one or more speakers to protect the one or more speakers from foreign particles, damage, and the like. The speaker mesh can be attached to the speaker frame 254 by a combination of welds and adhesives disposed over the welds. Providing the adhesives over the welds can prevent the speaker mesh from tearing away from the speaker frame 254, denting inward, or otherwise becoming detached from the speaker frame 254 or damaged, such as in an event of an impact to the speaker mesh and the speaker frame 254. The adhesives may be relatively elastic compared to the welds, and may allow the speaker mesh to move relative to the speaker frame 254 without becoming detached or damaged. The adhesives can have a larger area than the welds, can engage a larger number of filaments of the speaker mesh, and can thus distribute incoming forces to a larger area of the speaker frame 254 and the speaker mesh, thereby reducing detachment and damage. Additional details of the speaker frame 254 are discussed below with respect to FIGS. 11A through 13B.

Figure 3A:
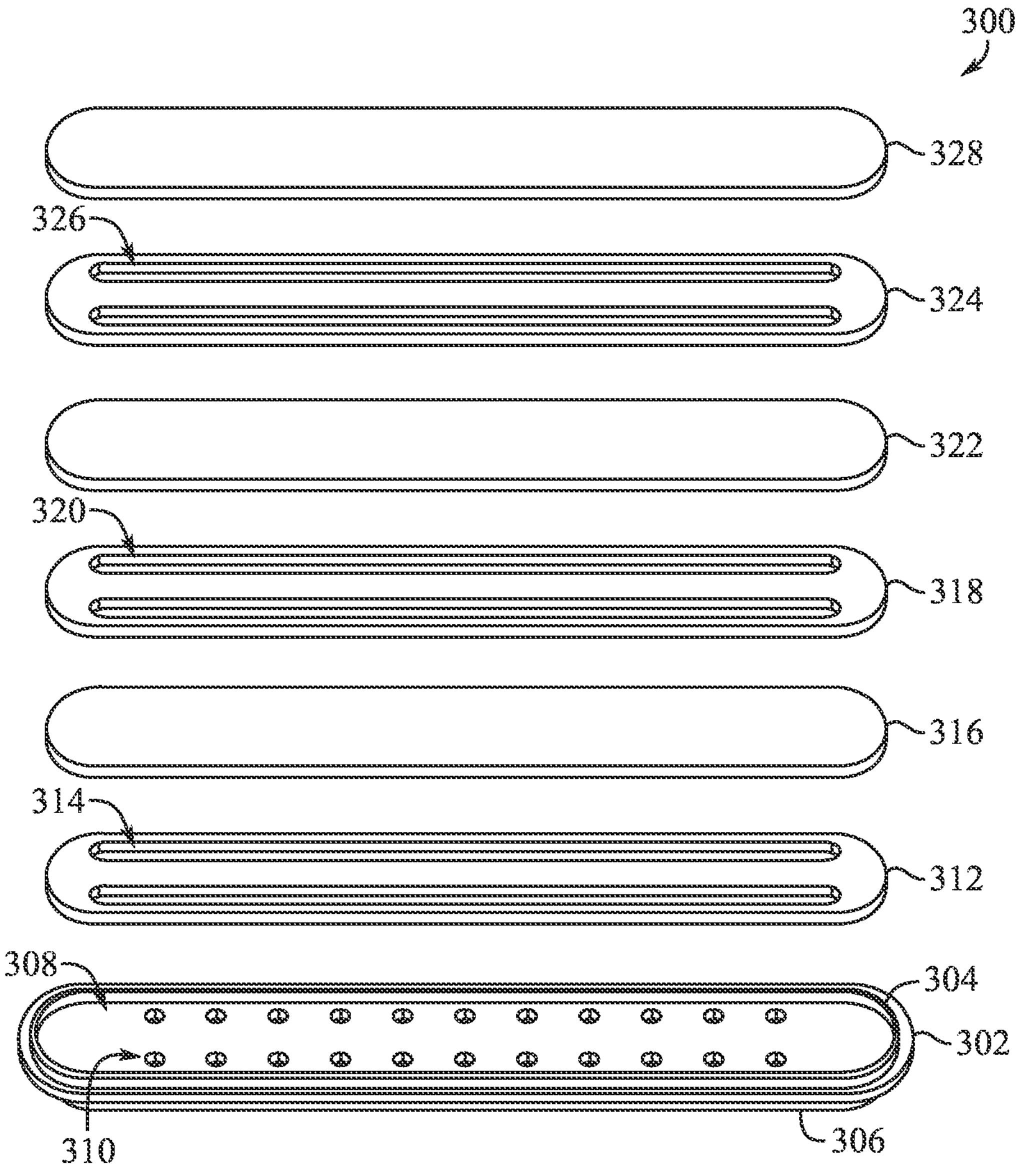
FIG. 3A is an exploded view of a seal for a wearable electronic device.

FIGS. 3A through 3D illustrate an exploded perspective view, a top-down view (with certain features, such as membrane layers, omitted for clarity), a cross-sectional lateral view, and a cross-sectional longitudinal view, respectively, of a seal 300 that can be included in an electronic device. As illustrated in FIG. 3A, the seal 300 can include a perforated support 302, an adhesive layer 312 on the perforated support 302, a membrane layer 316 on the adhesive layer 312, an adhesive layer 318 on the membrane layer 316, a membrane layer 322 on the adhesive layer 318, an adhesive layer 324 on the membrane layer 322, and a membrane layer 328 on the adhesive layer 324. The perforated support 302 can include an upper lip 304 defining a recess 308, a lower lip 306 opposite the upper lip 304, and holes 310 extending through the perforated support 302. Although FIGS. 3A through 3D illustrate two rows of holes 310 with eleven holes 310 in each row, any number of rows of holes 310 with any number of holes 310 may be provided. The holes 310 can have diameters in a range from about 1 μm to about 1 mm, from about 10 μm to about 300 μm, from about 20 μm to about 200 μm, or the like. The recess 308, the adhesive layers 312, 318, 324, and the membrane layers 316, 322, 328 can be sized and shaped such that the adhesive layers 312, 318, 324 and the membrane layers 316, 322, 328 fit within the recess 308 in the upper lip 304 of the perforated support 302. The upper lip 304 can encircle or otherwise surround the adhesive layers 312, 318, 324 and the membrane layers 316, 322, 328. In some examples, one or more of the adhesive layers 312, 318, 324 and/or the membrane layers 316, 322, 328 can extend above an upper surface of the upper lip 304, or can be disposed below the upper surface of the upper lip 304.

Figure 3B:
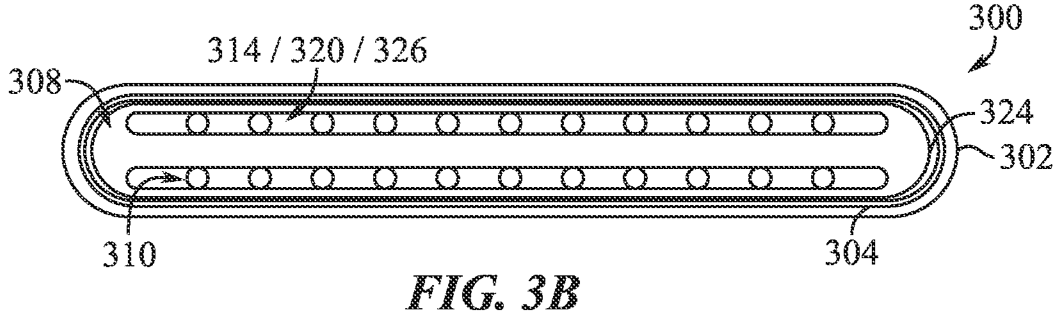
FIG. 3B is a top-down view of a seal for a wearable electronic device.
Figure 3C:
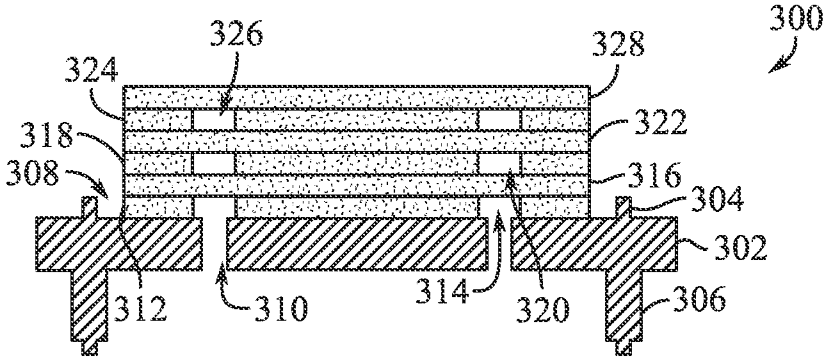
FIG. 3C is a cross-sectional view of a seal for a wearable electronic device.
Figure 3D:
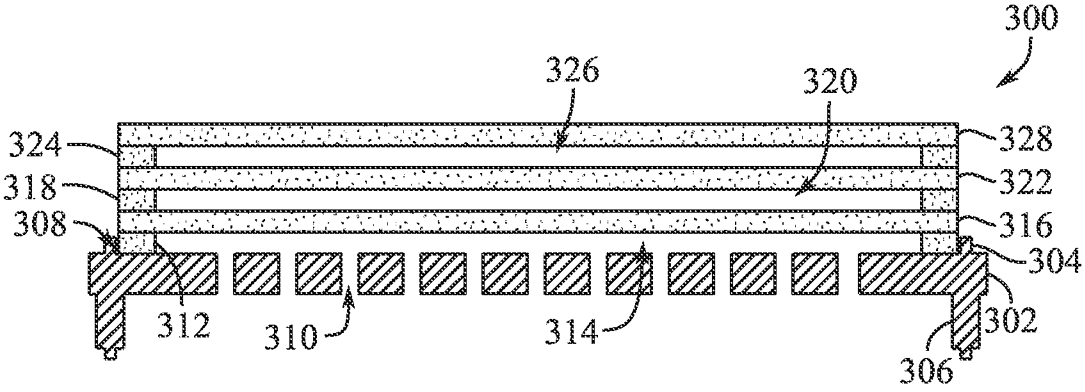
FIG. 3D is a cross-sectional view of a seal for a wearable electronic device.

As illustrated in FIGS. 3A through 3D, each of the adhesive layers 312, 318, 324 can be provided with longitudinal slots 314, 320, and 326, respectively. The longitudinal slots 314, 320, 326 can provide airflow between the respective membrane layers 316, 322, 328 and between the membrane layer 316 and the perforated support 302. As illustrated in FIG. 3B, the longitudinal slots 314, 320, 326 can be aligned with the holes 310 of the perforated support 302 to provide increased airflow between the holes 310 and an external environment through the adhesive layers 312, 318, 324 and the membrane layers 316, 322, 328. The longitudinal slots 314, 320, 326 can have lengths equal to or greater than a distance between outer edges of peripheral ones of the holes 310 in each row of the holes 310, as illustrated in FIGS. 3B and 3D. The longitudinal slots 314, 320, 326 can have widths equal to or greater than the diameters of the holes 310. For example, as illustrated in FIGS. 3B and 3C, the longitudinal slots 314, 320, 326 can have widths greater than the diameters of the holes 310. The adhesive layers 312, 318, 324 can provide support for each of the overlying membrane layers 316, 322, 328, and can prevent the membrane layers 316, 322, 328 from sagging, contacting one another, and the like, which helps prevent moisture, contaminants, and the like from penetrating into lower layers, even when upper layers of the seal 300 are compromised.

Each of the membrane layers 316, 322, 328 can provide the same or different levels of water protection and air flow properties, can be formed by the same or different manufacturers (such as Gore & Associates, Inc., Nitto Denko Corp. W. L., or the like), can have the same or different thicknesses, and the like. The membrane layers 316, 322, 328 can have waterproof ratings ranging from about 1 bar to about 100 bar, such as from about 1 bar to about 15 bar. The membrane layers 316, 322, 328 can have thicknesses in a range from about 0.1 μm to about 1 mm, from about 1 μm to about 10 μm, or the like. In some examples, the membrane layers 316, 322, 328 can be formed from oleophobic materials.

In some examples, outer ones of the membrane layers 316, 322, 328 can have relatively high thicknesses and low waterproof ratings as compared to inner ones of the membrane layers 316, 322, 328. However, in some examples, outer ones of the membrane layers 316, 322, 328 can have relatively low thicknesses and high waterproof ratings as compared to inner ones of the membrane layers 316, 322, 328. In some examples, all of the membrane layers 316, 322, 328 can have the same thicknesses and the same waterproof ratings. Relative thicknesses of the membrane layers 316, 322, 328 (e.g., ratios of thicknesses among the membrane layers 316, 322, 328) can be in a range from about 1 to about 20, from about 1.1 to about 15, from about 1.25 to about 5, from about 1.5 to about 2, or the like. Relative waterproof ratings of the membrane layers 316, 322, 328 (e.g., ratios of waterproof ratings among the membrane layers 316, 322, 328) can be in a range from about 1 to about 20, from about 1.1 to about 15, from about 1.25 to about 5, from about 1.5 to about 2, or the like. Each of the membrane layers 316, 322, 328 can include a network of pores with diameters that allow air to flow through the pores, while resisting water flow through the pores up to a specified water pressure. Membrane layers that provide greater waterproof ratings can include narrower pores, and can be formed with thinner thicknesses to allow for sufficient air flow through the membrane layers.

As an example, the membrane layer 328 can have a waterproof rating of about 5 bar (or greater than about 5 bar) and a thickness of about 8 μm, and the membrane layers 316, 322 can have waterproof ratings of about 10 bar (or greater than about 10 bar) and thicknesses of about 5 μm, about 6 μm, or the like. As an additional example, the membrane layers 322, 328 can have waterproof ratings of about 5 bar (or greater than about 5 bar) and thicknesses of about 8 μm, and the membrane layer 316 can have a waterproof rating of about 10 bar (or greater than about 10 bar) and a thickness of about 5 μm, about 6 μm, or the like. Providing membrane layers 316, 322, 328 with greater thicknesses can provide improved protection from mechanical damage (e.g., protection from sand and the like); accumulation, such as through chemical contamination (e.g., soap, other chemicals, and the like); and the like. Providing membrane layers 316, 322, 328 with higher waterproof ratings can improve the waterproof rating of the seal 300. Combining membrane layers 316, 322, 328 with greater thicknesses and membrane layers 316, 322, 328 with improved waterproof ratings can provide the seal 300 with improved resistance to mechanical damage, chemical contamination, improved water protection, and the like, while allowing for sufficient air flow through the seal

300. This protects underlying devices (e.g., internal components, electronics, or the like) of the electronic device, such as microphones, speakers, processors, and the like, while still allowing sufficient air flow to the underlying devices.

Figure 4A:
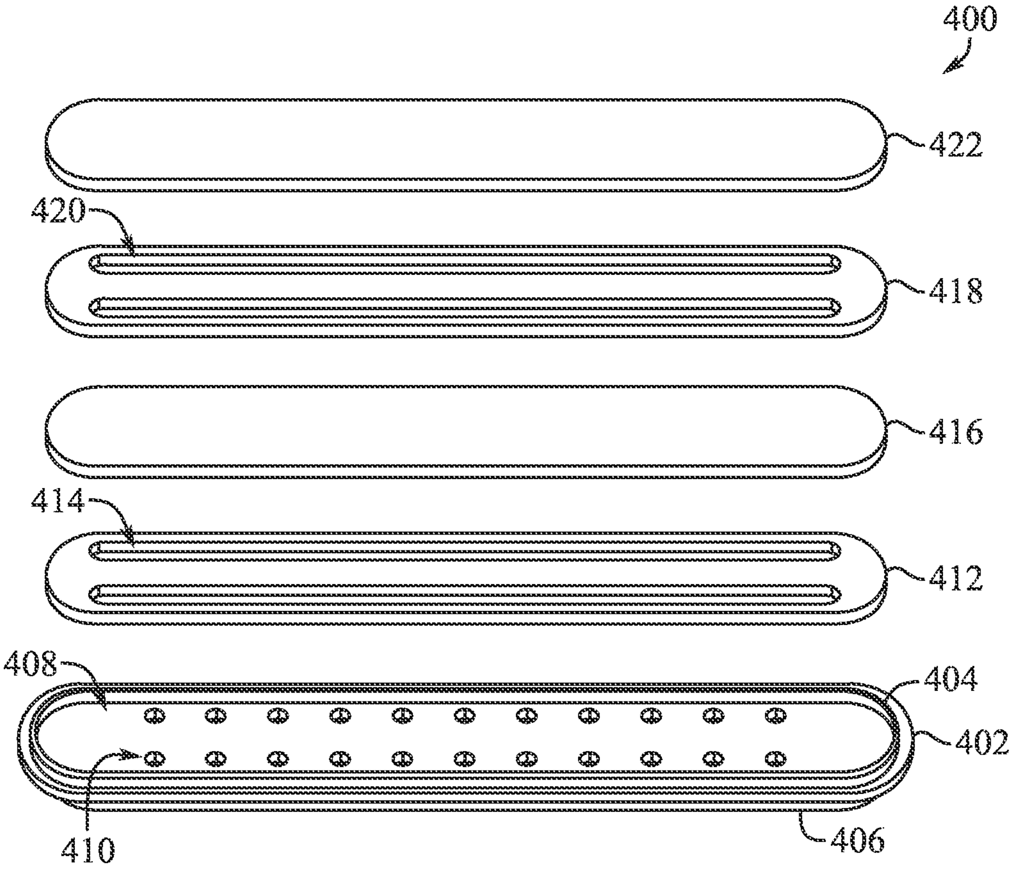
FIG. 4A is an exploded view of a seal for a wearable electronic device.

FIGS. 4A through 4D illustrate an exploded perspective view, a top-down view (with certain features, such as membrane layer, omitted for clarity), a cross-sectional lateral view, and a cross-sectional longitudinal view, respectively, of a seal 400 that can be included in an electronic device. As illustrated in FIG. 4A, the seal 400 can include a perforated support 402, an adhesive layer 412 on the perforated support 402, a membrane layer 416 on the adhesive layer 412, an adhesive layer 418 on the membrane layer 416, and a membrane layer 422 on the adhesive layer 418. The perforated support 402 can include an upper lip 404 defining a recess 408, a lower lip 406 opposite the upper lip 404, and holes 410 extending through the perforated support 402. The perforated support 402 can be the same as or similar to the perforated support 302 described above in reference to FIGS. 3A through 3D.

Figure 4B:
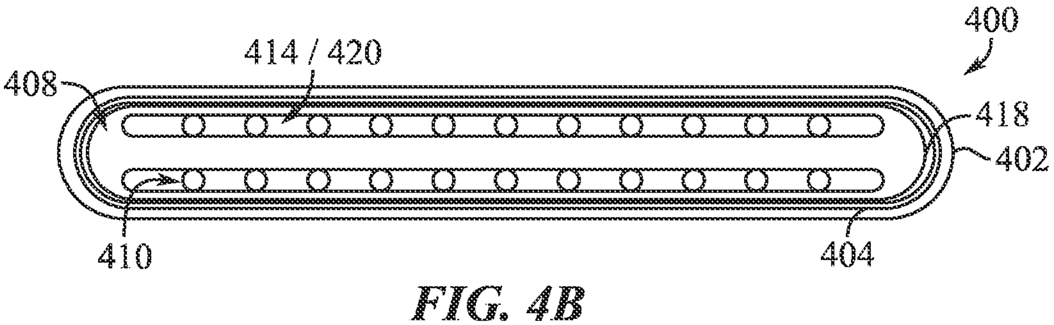
FIG. 4B is a top-down view of a seal for a wearable electronic device.
Figure 4C:
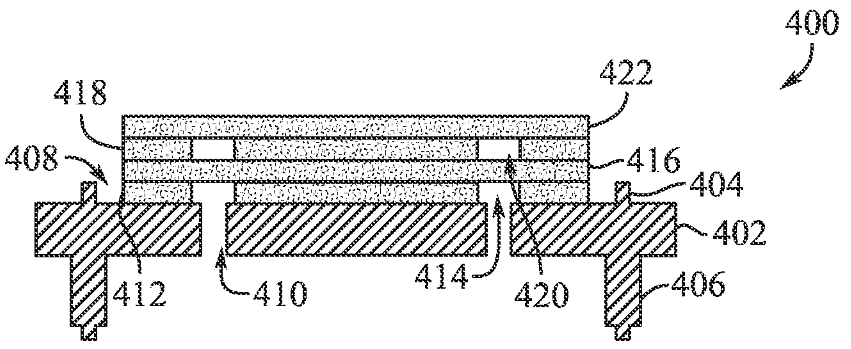
FIG. 4C is a cross-sectional view of a seal for a wearable electronic device.
Figure 4D:
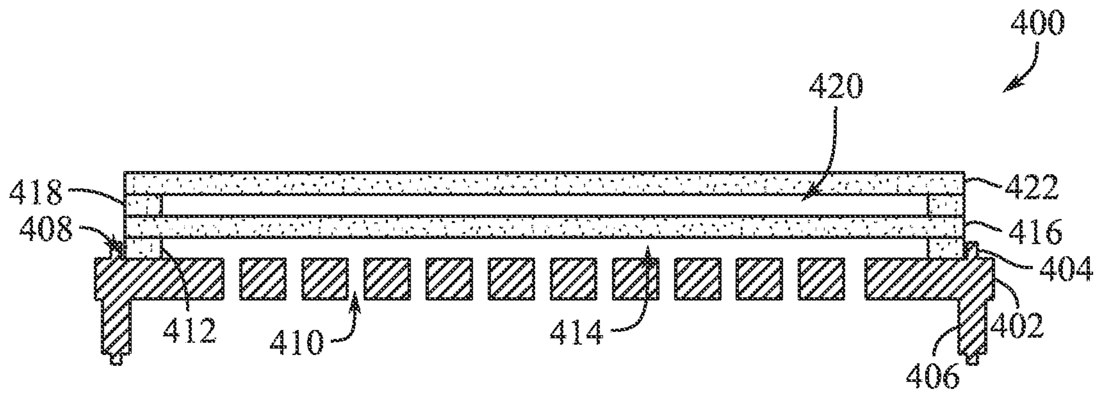
FIG. 4D is a cross-sectional view of a seal for a wearable electronic device.

As illustrated in FIGS. 4A through 4D, each of the adhesive layers 412, 418 can be provided with longitudinal slots 414, 420, respectively. The longitudinal slots 414, 420 can provide airflow between the respective membrane layers 416, 422 and between the membrane layer 416 and the perforated support 402. As illustrated in FIG. 4B, the longitudinal slots 414, 420 can be aligned with the holes 410 of the perforated support 402 to provide increased airflow between the holes 410 and an external environment through the adhesive layers 412, 418 and the membrane layers 416, 422. The longitudinal slots 414, 420 can have lengths equal to or greater than a distance between outer edges of peripheral ones of the holes 410 in each row of the holes 410, as illustrated in FIGS. 4B and 4D. The longitudinal slots 414, 420 can have widths equal to or greater than the diameters of the holes 410. For example, as illustrated in FIGS. 4B and 4C, the longitudinal slots 414, 420 can have widths greater than the diameters of the holes 410. The adhesive layers 412, 418 can provide support for each of the overlying membrane layers 416, 422, and can prevent the membrane layers 416, 422 from sagging, contacting one another, and the like, which helps prevent moisture, contaminants, and the like from penetrating into lower layers, even when upper layers of the seal 400 are compromised.

The membrane layers 416, 422 can be the same as or similar to the membrane layers 316, 322, 328 described above in reference to FIGS. 3A through 3D. In some examples, the membrane layer 422 can have a relatively high thickness and low waterproof rating as compared to the membrane layer 416. In some examples, the membrane layer 422 can have a relatively low thickness and high waterproof rating as compared to the membrane layer 416. In some examples, the membrane layers 416, 422 can have the same thicknesses and the same waterproof ratings. As an example, the membrane layer 422 can have a waterproof rating of about 5 bar (or greater than about 5 bar) and a thickness of about 8 μm, and the membrane layer 416 can have a waterproof rating of about 10 bar (or greater than about 10 bar) and a thickness of about 5 μm, about 6 μm, or the like. As an additional example, the membrane layers 416, 422 can have waterproof ratings of about 10 bar (or greater than about 10 bar) and thicknesses of about 5 μm, about 6 μm, or the like. Providing multiple membrane layers 416, 422 with the same or different thicknesses and water protection layers can provide the seal 400 with improved resistance to mechanical damage, chemical contamination, improved water protection, and the like, while allowing for sufficient air flow through the seal 400. This protects underlying devices (e.g., internal components, electronics, or the like) of the electronic device, such as microphones, speakers, processors, and the like, while still allowing sufficient air flow to the underlying devices.

Figure 5A:
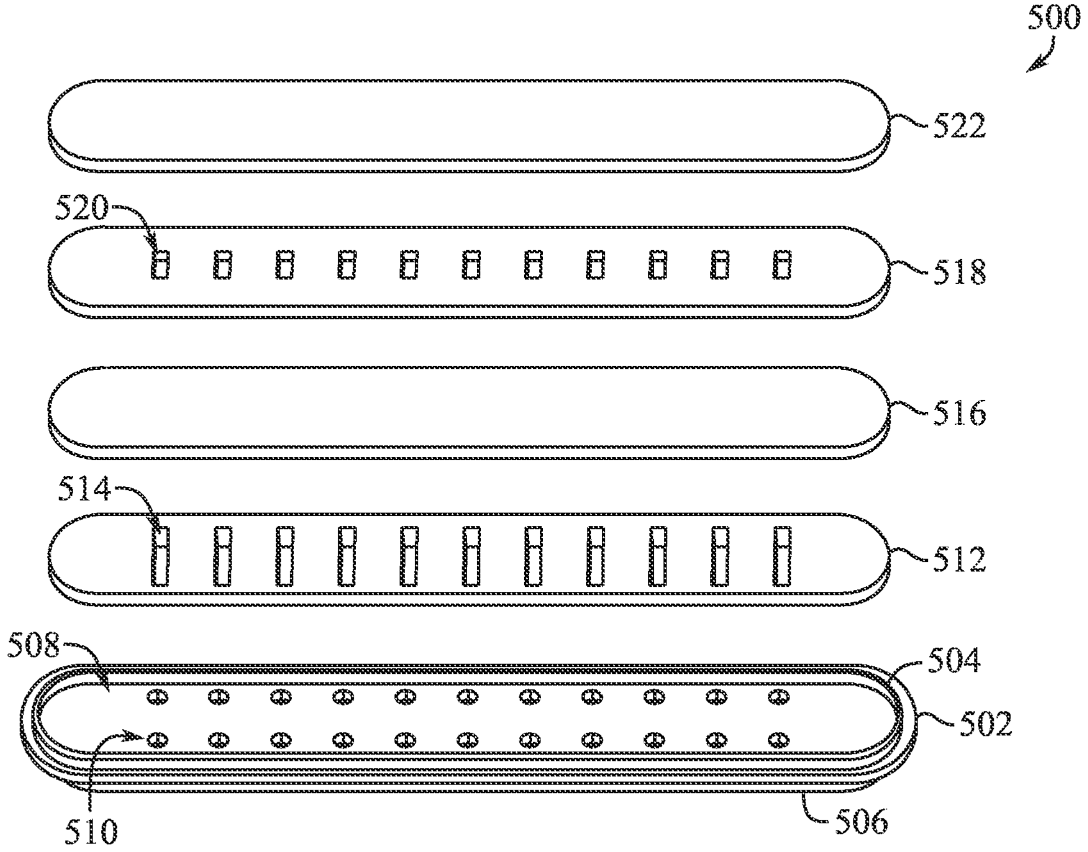
FIG. 5A is an exploded view of a seal for a wearable electronic device.

FIGS. 5A through 5D illustrate an exploded perspective view, a top-down view (with certain features, such as membrane layer, omitted for clarity), a cross-sectional lateral view, and a cross-sectional longitudinal view, respectively, of a seal 500 that can be included in an electronic device. As illustrated in FIG. 5A, the seal 500 can include a perforated support 502, an adhesive layer 512 on the perforated support 502, a membrane layer 516 on the adhesive layer 512, an adhesive layer 518 on the membrane layer 516, and a membrane layer 522 on the adhesive layer 518. The perforated support 502 can include an upper lip 504 defining a recess 508, a lower lip 506 opposite the upper lip 504, and holes 510 extending through the perforated support 502. The perforated support 502 can be the same as or similar to the perforated support 302 described above in reference to FIGS. 3A through 3D.

Figure 5B:
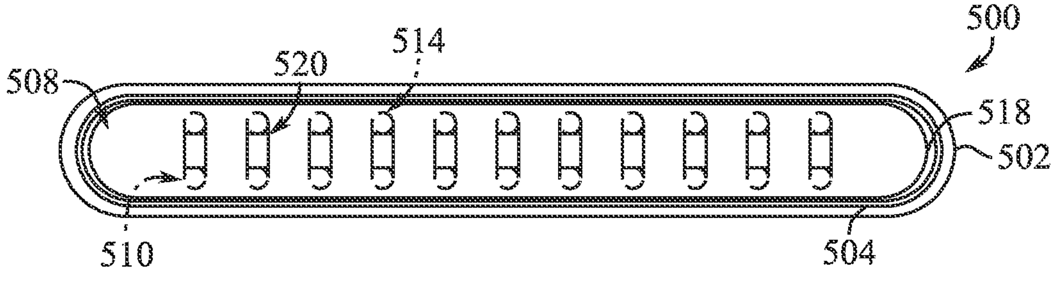
FIG. 5B is a top-down view of a seal for a wearable electronic device.
Figure 5C:
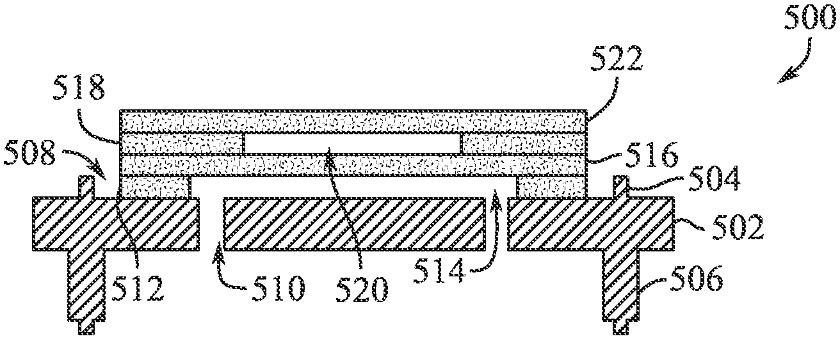
FIG. 5C is a cross-sectional view of a seal for a wearable electronic device.

As illustrated in FIGS. 5A through 5D, each of the adhesive layers 512, 518 can be provided with lateral slots 514, 520, respectively. The lateral slots 514, 520 can provide airflow between the respective membrane layers 516, 522 and between the membrane layer 516 and the perforated support 502. As illustrated in FIG. 5B, the lateral slots 514, 520 can be aligned with pairs of the holes 510 of the perforated support 502 to provide increased airflow between the holes 510 and an external environment through the adhesive layers 512, 518 and the membrane layers 516, 522. The lateral slots 514, 520 can each extend in a direction parallel to a line extending between a pair of holes 510 located in adjacent rows of the holes 510. The lateral slots 514 of the adhesive layer 512 can have lengths equal to or greater than a distance between outer edges of holes 510 underlying the lateral slots 514, as illustrated in FIGS. 5B and 5C. The lateral slots 520 of the adhesive layer 518 can have lengths less than a distance between inner edges of holes 510 underlying the lateral slots 520. This provides improved protection to the holes 510, as there is not a direct path from the external environment through the membrane layers 516, 522 and the lateral slots 514, 520 to the holes 510. In some examples, both the lateral slots 514, 520 can have lengths equal to or greater than the distance between outer edges of holes 510 or can have lengths less than the distance between inner edges of holes 510.

Figure 5D:
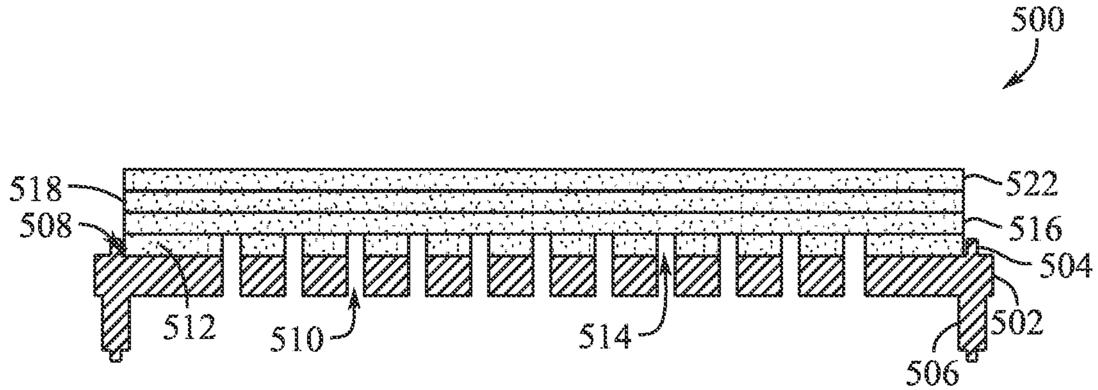
FIG. 5D is a cross-sectional view of a seal for a wearable electronic device.

The lateral slots 514, 520 can have widths equal to or greater than the diameters of the holes 510. For example, as illustrated in FIGS. 5B and 5D, the lateral slots 514, 520 can have widths equal to the diameters of the holes 510. The adhesive layers 512, 518 can provide support for each of the overlying membrane layers 516, 522, and can prevent the membrane layers 516, 522 from sagging, contacting one another, and the like, which helps prevent moisture, contaminants, and the like from penetrating into lower layers, even when upper layers of the seal 500 are compromised.

The membrane layers 516, 522 can be the same as or similar to the membrane layers 316, 322, 328 described above in reference to FIGS. 3A through 3D. In some examples, the membrane layer 522 can have a relatively high thickness and low waterproof rating as compared to the membrane layer 516. In some examples, the membrane layer 522 can have a relatively low thickness and high waterproof rating as compared to the membrane layer 516. In some examples, the membrane layers 516, 522 can have the same thicknesses and the same waterproof ratings. As an example, the membrane layer 522 can have a waterproof rating of about 5 bar (or greater than about 5 bar) and a thickness of about 8 μm, and the membrane layer 516 can have a waterproof rating of about 10 bar (or greater than about 10 bar) and a thickness of about 5 μm, about 6 μm, or the like. As an additional example, the membrane layers 516, 522 can have waterproof ratings of about 10 bar (or greater than about 10 bar) and thicknesses of about 5 μm, about 6 μm, or the like. Providing multiple membrane layers 516, 522 with the same or different thicknesses and water protection layers can provide the seal 500 with improved resistance to mechanical damage, chemical contamination, improved water protection, and the like, while allowing for sufficient air flow through the seal 500. This protects underlying devices (e.g., internal components, electronics, or the like) of the electronic device, such as microphones, speakers, processors, and the like, while still allowing sufficient air flow to the underlying devices.

Figure 6A:
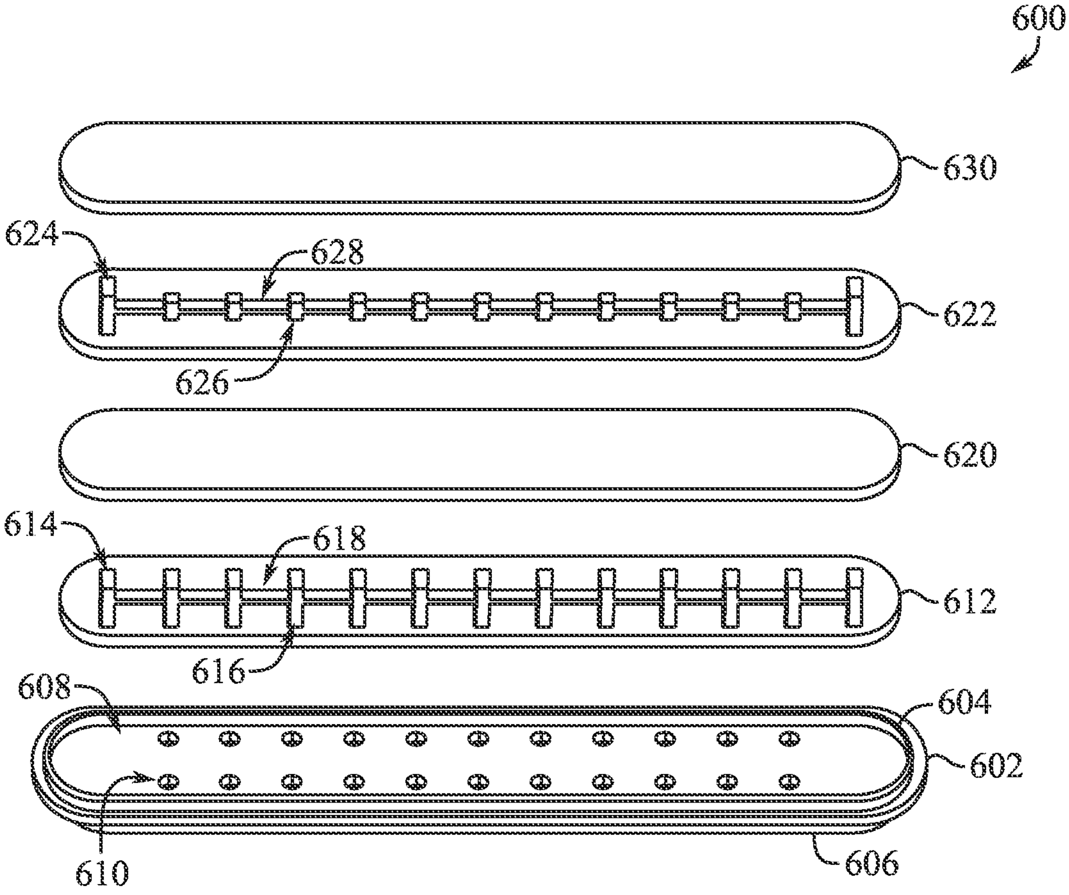
FIG. 6A is an exploded view of a seal for a wearable electronic device.

FIGS. 6A through 6E illustrate an exploded perspective view, a top-down view (with certain features, such as membrane layer, omitted for clarity), a cross-sectional lateral view, an offset cross-sectional longitudinal view, and a central cross-sectional longitudinal view, respectively, of a seal 600 that can be included in an electronic device. As illustrated in FIG. 6A, the seal 600 can include a perforated support 602, an adhesive layer 612 on the perforated support 602, a membrane layer 620 on the adhesive layer 612, an adhesive layer 622 on the membrane layer 620, and a membrane layer 630 on the adhesive layer 622. The perforated support 602 can include an upper lip 604 defining a recess 608, a lower lip 606 opposite the upper lip 604, and holes 610 extending through the perforated support 602. The perforated support 602 can be the same as or similar to the perforated support 302 described above in reference to FIGS. 3A through 3D.

Figure 6B:
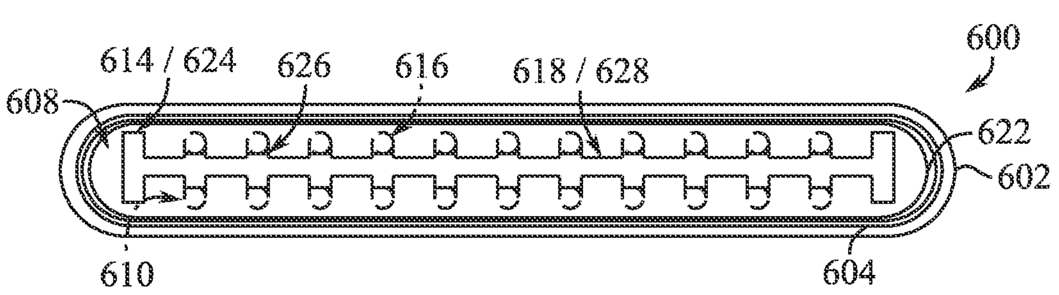
FIG. 6B is a top-down view of a seal for a wearable electronic device.
Figure 6C:
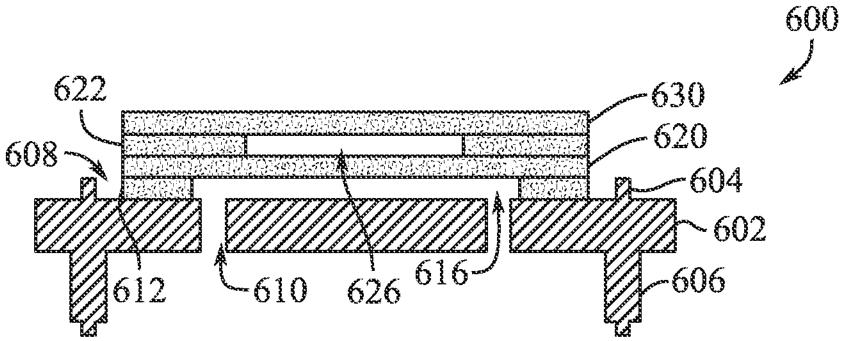
FIG. 6C is a cross-sectional view of a seal for a wearable electronic device.

As illustrated in FIGS. 6A through 6E, the adhesive layer 612 can be provided with lateral slots 614 and 616 and longitudinal slots 618, and the adhesive layer 622 can be provided with lateral slots 624 and 626 and longitudinal slots 628. The lateral slots 614, 616, 624, 626 and the longitudinal slots 618, 628 can provide airflow between the respective membrane layers 620, 630 and between the membrane layer 620 and the perforated support 602. As illustrated in FIG. 6B, the lateral slots 616, 626 can be aligned with pairs of the holes 610 of the perforated support 602 to provide increased airflow between the holes 610 and an external environment through the adhesive layers 612, 622 and the membrane layers 620, 630. The lateral slots 616, 626 can each extend in a direction parallel to a line extending between a pair of holes 610 located in adjacent rows of the holes 610. The lateral slots 616 of the adhesive layer 612 can have lengths equal to or greater than a distance between outer edges of holes 610 underlying the lateral slots 616, as illustrated in FIGS. 6B and 6C. The lateral slots 626 of the adhesive layer 622 can have lengths less than a distance between inner edges of holes 610 underlying the lateral slots 626. This provides improved protection to the holes 610, as there is not a direct path from the external environment through the membrane layers 620, 630 and the lateral slots 616, 626 to the holes 610. In some examples, both the lateral slots 616, 626 can have lengths equal to or greater than the distance between outer edges of holes 610 or can have lengths less than the distance between inner edges of holes 610.

The lateral slots 614, 624 can be disposed between the lateral slots 616, 626 and longitudinal ends of the seal 600. The lateral slots 614, 624 can have lengths equal to, greater than, or less than the lateral slots 616 and/or the lateral slots 626. The lateral slots 614, 624 can provide increased airflow through the adhesive layers 612, 622.

Figure 6D:
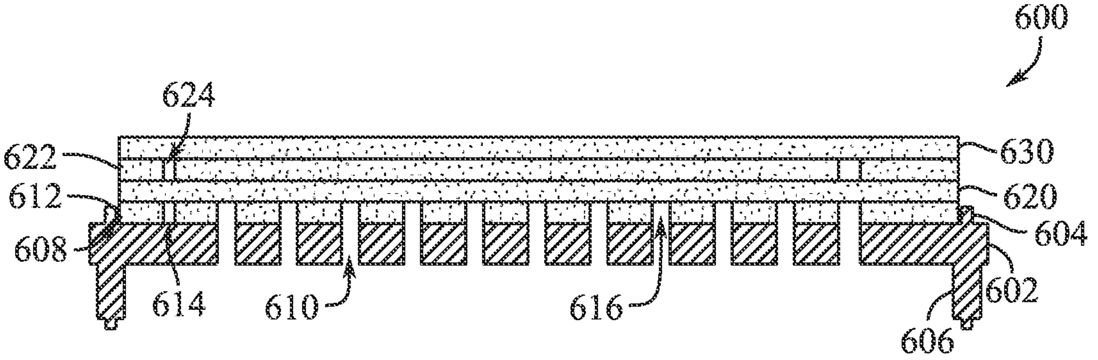
FIG. 6D is a cross-sectional view of a seal for a wearable electronic device.
Figure 6E:
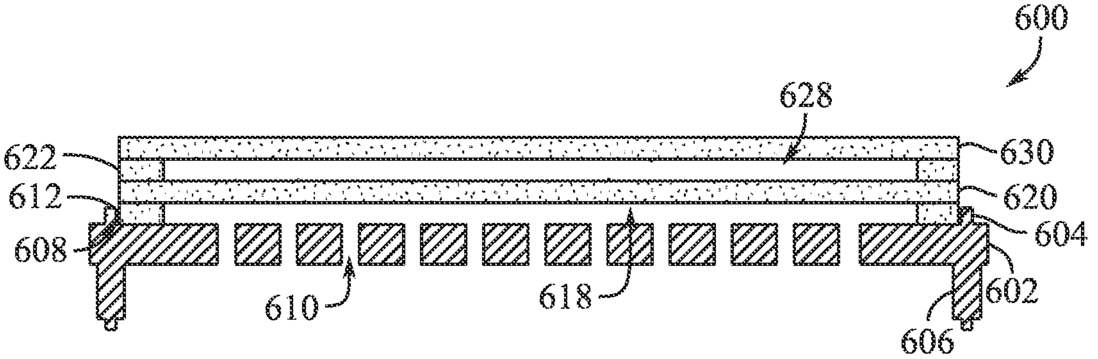
FIG. 6E is a cross-sectional view of a seal for a wearable electronic device.

The longitudinal slots 618, 628 can be disposed between the rows of holes 610. The longitudinal slots 618, 628 can extend between opposite ones of the lateral slots 614, 624, and can have lengths greater than distances between outer edges of peripheral ones of the holes 610 in each row of the holes 610, as illustrated in FIGS. 6B and 6E. The longitudinal slots 618, 628 can provide increased airflow through the adhesive layers 612, 622.

The lateral slots 614, 616, 624, 626 and the longitudinal slots 618, 628 can have widths equal to, greater than, or less than the diameters of the holes 610. For example, as illustrated in FIGS. 6B and 6D, the lateral slots 614, 616, 624, 626 and the longitudinal slots 618, 628 can have widths greater than the diameters of the holes 610. The adhesive layers 612, 622 can provide support for each of the overlying membrane layers 620, 630, and can prevent the membrane layers 620, 630 from sagging, contacting one another, and the like, which helps prevent moisture, contaminants, and the like from penetrating into lower layers, even when upper layers of the seal 600 are compromised.

The membrane layers 620, 630 can be the same as or similar to the membrane layers 316, 322, 328 described above in reference to FIGS. 3A through 3D. In some examples, the membrane layer 630 can have a relatively high thickness and low waterproof rating as compared to the membrane layer 620. In some examples, the membrane layer 630 can have a relatively low thickness and high waterproof rating as compared to the membrane layer 620. In some examples, the membrane layers 620, 630 can have the same thicknesses and the same waterproof ratings. As an example, the membrane layer 630 can have a waterproof rating of about 5 bar (or greater than about 5 bar) and a thickness of about 8 μm, and the membrane layer 620 can have a waterproof rating of about 10 bar (or greater than about 10 bar) and a thickness of about 5 μm, about 6 μm, or the like. As an additional example, the membrane layers 620, 630 can have waterproof ratings of about 10 bar (or greater than about 10 bar) and thicknesses of about 5 μm, about 6 μm, or the like. Providing multiple membrane layers 620, 630 with the same or different thicknesses and water protection layers can provide the seal 600 with improved resistance to mechanical damage, chemical contamination, improved water protection, and the like, while allowing for sufficient air flow through the seal 600. This protects underlying devices (e.g., internal components, electronics, or the like) of the electronic device, such as microphones, speakers, processors, and the like, while still allowing sufficient air flow to the underlying devices.

Figure 7A:
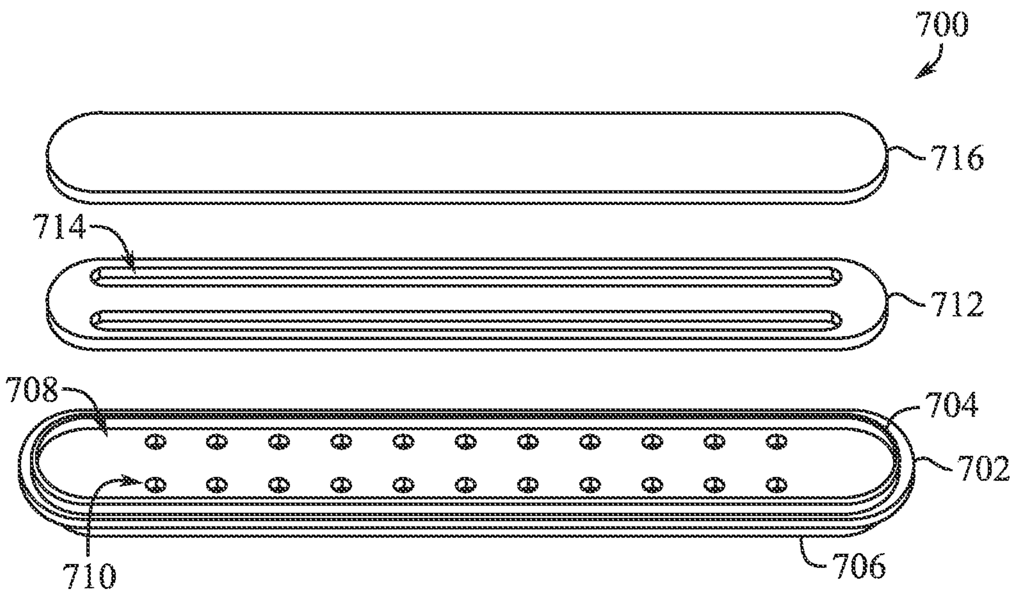
FIG. 7A is an exploded view of a seal for a wearable electronic device.

FIGS. 7A through 7D illustrate an exploded perspective view, a top-down view (with certain features, such as membrane layer, omitted for clarity), a cross-sectional lateral view, and a cross-sectional longitudinal view, respectively, of a seal 700 that can be included in an electronic device. As illustrated in FIG. 7A, the seal 700 can include a perforated support 702, an adhesive layer 712 on the perforated support 702, and a membrane layer 716 on the adhesive layer 712. The perforated support 702 can include an upper lip 704 defining a recess 708, a lower lip 706 opposite the upper lip 704, and holes 710 extending through the perforated support 702. The perforated support 702 can be the same as or similar to the perforated support 302 described above in reference to FIGS. 3A through 3D.

Figure 7B:
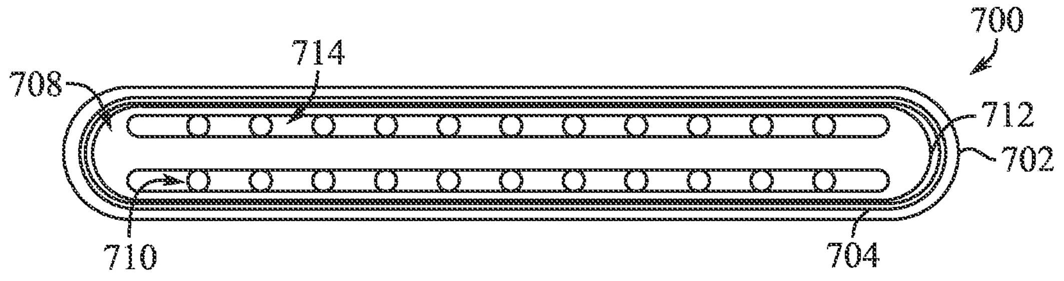
FIG. 7B is a top-down view of a seal for a wearable electronic device.
Figure 7C:
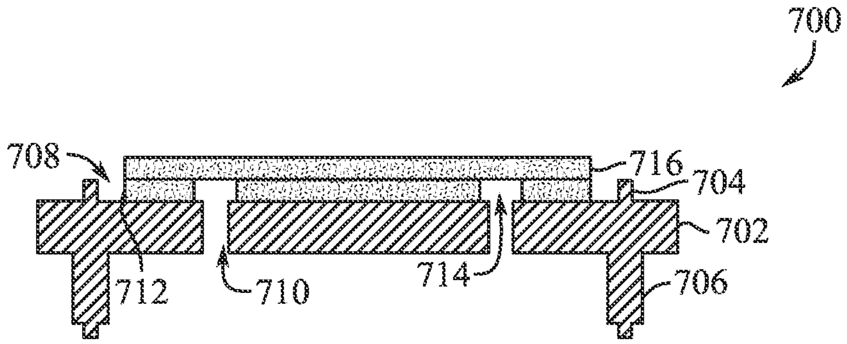
FIG. 7C is a cross-sectional view of a seal for a wearable electronic device.
Figure 7D:
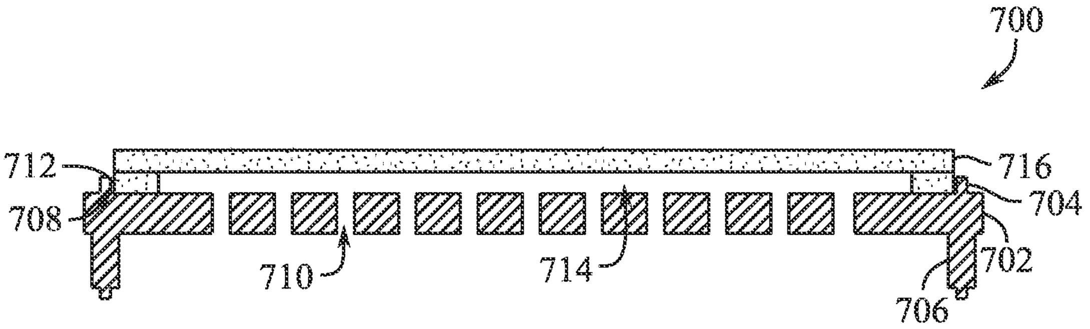
FIG. 7D is a cross-sectional view of a seal for a wearable electronic device.

As illustrated in FIGS. 7A through 7D, each of the adhesive layer 712 can be provided with longitudinal slots 714. The longitudinal slots 714 can provide airflow between the membrane layer 716 and the perforated support 702. As illustrated in FIG. 7B, the longitudinal slots 714 can be aligned with the holes 710 of the perforated support 702 to provide increased airflow between the holes 710 and an external environment through the adhesive layer 712 and the membrane layer 716. The longitudinal slots 714 can have lengths equal to or greater than a distance between outer edges of peripheral ones of the holes 710 in each row of the holes 710, as illustrated in FIGS. 7B and 7D. The longitudinal slots 714 can have widths equal to or greater than the diameters of the holes 710. For example, as illustrated in FIGS. 7B and 7C, the longitudinal slots 714 can have widths greater than the diameters of the holes 710. The adhesive layer 712 can provide support for the overlying membrane layer 716, and can prevent the membrane layer 716 from sagging, contacting the perforated support 702, and the like, which helps prevent moisture, contaminants, and the like from penetrating into the perforated support 702.

The membrane layer 716 can be the same as or similar to the membrane layers 316, 322, 328 described above in reference to FIGS. 3A through 3D. In some examples, the membrane layer 712 can have a waterproof rating of about 5 bar (or greater than about 5 bar) and a thickness of about 8 μm, a waterproof rating of about 10 bar (or greater than about 10 bar) and a thickness of about 5 μm, or the like, about 6 μm, or the like. Providing the seal with the membrane layer 716 and the adhesive layer 712 can provide the seal 700 with improved resistance to mechanical damage, chemical contamination, improved water protection, and the like, while allowing for sufficient air flow through the seal 700. This protects underlying devices (e.g., internal components, electronics, or the like) of the electronic device, such as microphones, speakers, processors, and the like, while still allowing sufficient air flow to the underlying devices.

Figure 8A:
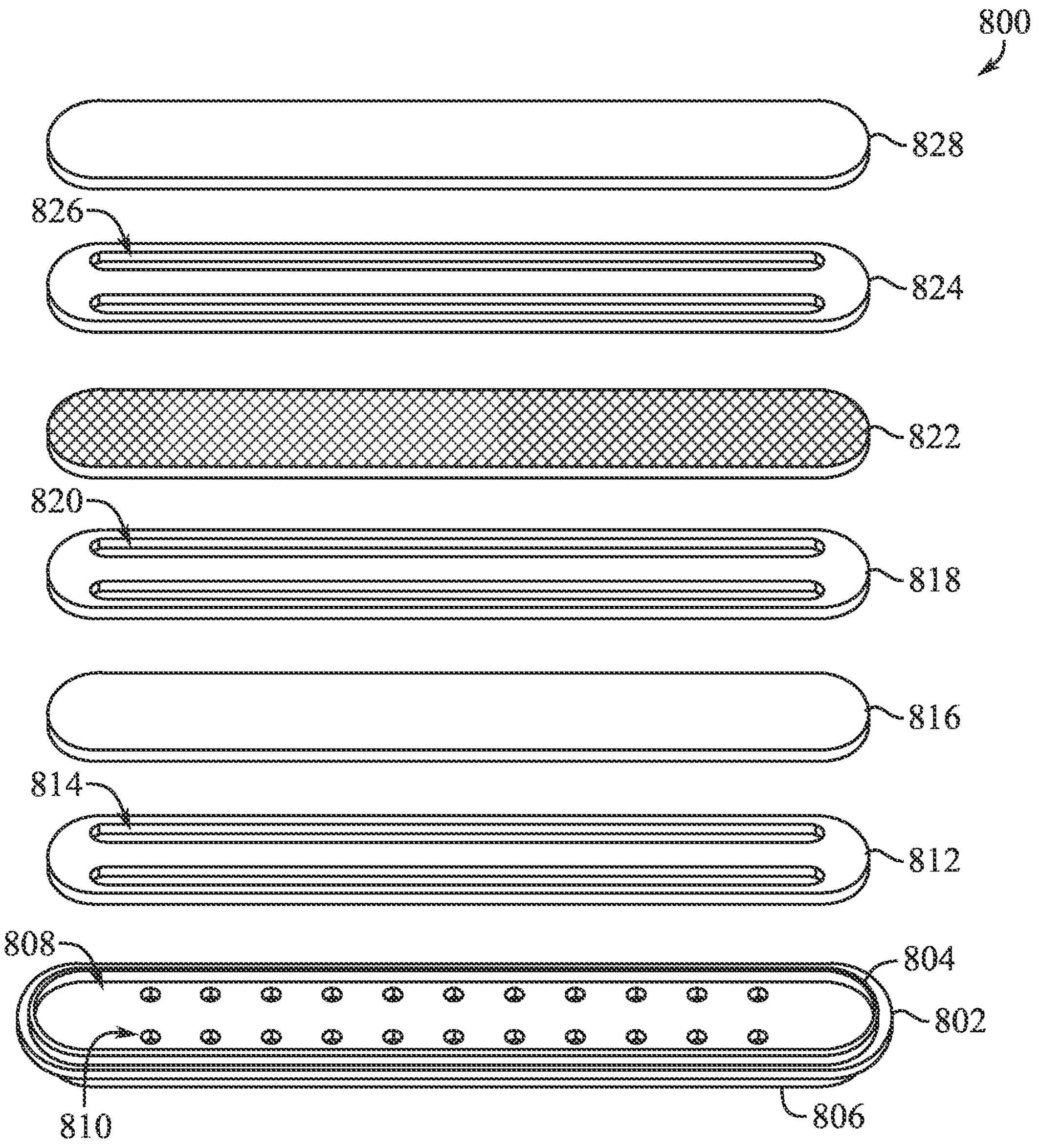
FIG. 8A is an exploded view of a seal for a wearable electronic device.

FIGS. 8A through 8D illustrate an exploded perspective view, a top-down view (with certain features, such as membrane layer, omitted for clarity), a cross-sectional lateral view, and a cross-sectional longitudinal view, respectively, of a seal 800 that can be included in an electronic device. As illustrated in FIG. 8A, the seal 800 can include a perforated support 802, an adhesive layer 812 on the perforated support 802, a membrane layer 816 on the adhesive layer 812, an adhesive layer 818 on the membrane layer 816, a mesh layer 822 on the adhesive layer 818, an adhesive layer 824 on the mesh layer 822, and a membrane layer 828 on the adhesive layer 824. The perforated support 802 can include an upper lip 804 defining a recess 808, a lower lip 806 opposite the upper lip 804, and holes 810 extending through the perforated support 802. The perforated support 802 can be the same as or similar to the perforated support 302 described above in reference to FIGS. 3A through 3D.

Figure 8B:
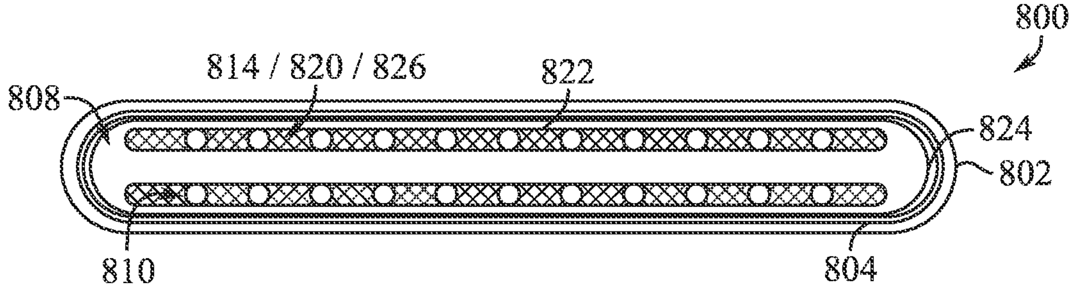
FIG. 8B is a top-down view of a seal for a wearable electronic device.
Figure 8C:
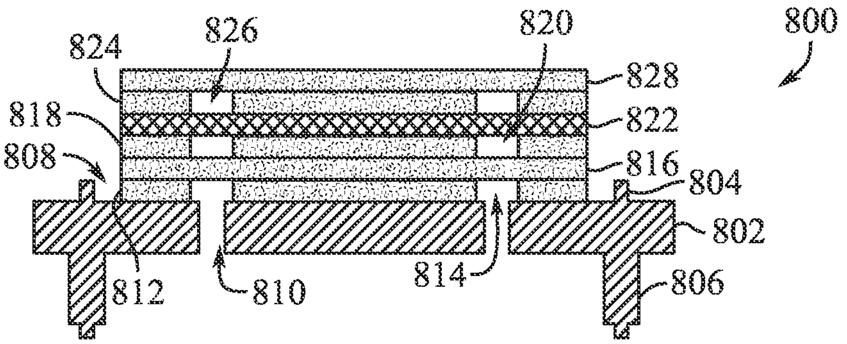
FIG. 8C is a cross-sectional view of a seal for a wearable electronic device.
Figure 8D:
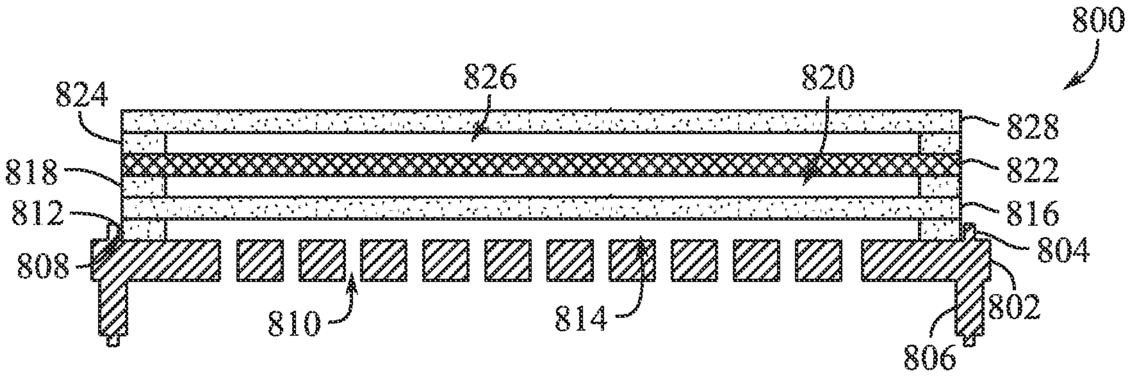
FIG. 8D is a cross-sectional view of a seal for a wearable electronic device.

As illustrated in FIGS. 8A through 8D, each of the adhesive layers 812, 818, 824 can be provided with longitudinal slots 814, 820, 826, respectively. The longitudinal slots 814, 820, 826 can provide airflow between the respective membrane layers 816, 828; mesh layer 822; and perforated support 802. As illustrated in FIG. 8B, the longitudinal slots 814, 820, 826 can be aligned with the holes 810 of the perforated support 802 to provide increased airflow between the holes 810 and an external environment through the adhesive layers 812, 818, 824, the membrane layers 816, 828, and the mesh layer 822. The longitudinal slots 814, 820, 826 can have lengths equal to or greater than a distance between outer edges of peripheral ones of the holes 810 in each row of the holes 810, as illustrated in FIGS. 8B and 8D. The longitudinal slots 814, 820, 826 can have widths equal to or greater than the diameters of the holes 810. For example, as illustrated in FIGS. 8B and 8C, the longitudinal slots 814, 820, 826 can have widths greater than the diameters of the holes 810. The adhesive layers 812, 818, 824 can provide support for each of the overlying membrane layers 816, 828, and can prevent the membrane layers 816, 828 from sagging, contacting one another, and the like, which helps prevent moisture, contaminants, and the like from penetrating into lower layers, even when upper layers of the seal 800 are compromised.

The mesh layer 822 can provide additional support for the membrane layers 816, 828, can prevent the membrane layers 816, 828 from sagging, ballooning, contacting one another, and the like. This helps prevent moisture, contaminants, and the like from penetrating into lower layers, even when upper layers of the seal 800 are compromised. Further, the mesh layer 822 can help to spread incoming forces across the seal 800 and prevent damage to the seal 800. In some examples, the mesh layer 822 can improve airflow through the seal 800. Although the mesh layer 822 is illustrated as being included between the membrane layers 816, 828, in some examples, the mesh layer 822 can be provided between the perforated support 802 and the membrane layers 816, 828. The mesh layer 822 can protect overlying layers from micro-burrs or the like that can be formed when the holes 810 are formed in the perforated support 802. The mesh layer 822 can be formed by interwoven filaments, and can be formed from materials such as polymers (e.g., nylon or the like), metals (e.g., stainless steel or the like), or the like.

The membrane layers 816, 828 can be the same as or similar to the membrane layers 316, 322, 328 described above in reference to FIGS. 3A through 3D. In some examples, the membrane layer 828 can have a relatively high thickness and low waterproof rating as compared to the membrane layer 816. In some examples, the membrane layer 828 can have a relatively low thickness and high waterproof rating as compared to the membrane layer 816. In some examples, the membrane layers 816, 828 can have the same thicknesses and the same waterproof ratings. As an example, the membrane layer 828 can have a waterproof rating of about 5 bar (or greater than about 5 bar) and a thickness of about 8 μm, and the membrane layer 816 can have a waterproof rating of about 10 bar (or greater than about 10 bar) and a thickness of about 5 μm, about 6 μm, or the like. As an additional example, both of the membrane layers 816, 828 can have waterproof ratings of about 10 bar (or greater than about 10 bar) and thicknesses of about 5 μm, about 6 μm, or the like. Providing multiple membrane layers 816, 828 with the same or different thicknesses and water protection layers can provide the seal 800 with improved resistance to mechanical damage, chemical contamination, improved water protection, and the like, while allowing for sufficient air flow through the seal 800. This protects underlying devices (e.g., internal components, electronics, or the like) of the electronic device, such as microphones, speakers, processors, and the like, while still allowing sufficient air flow to the underlying devices.

Figure 9A:
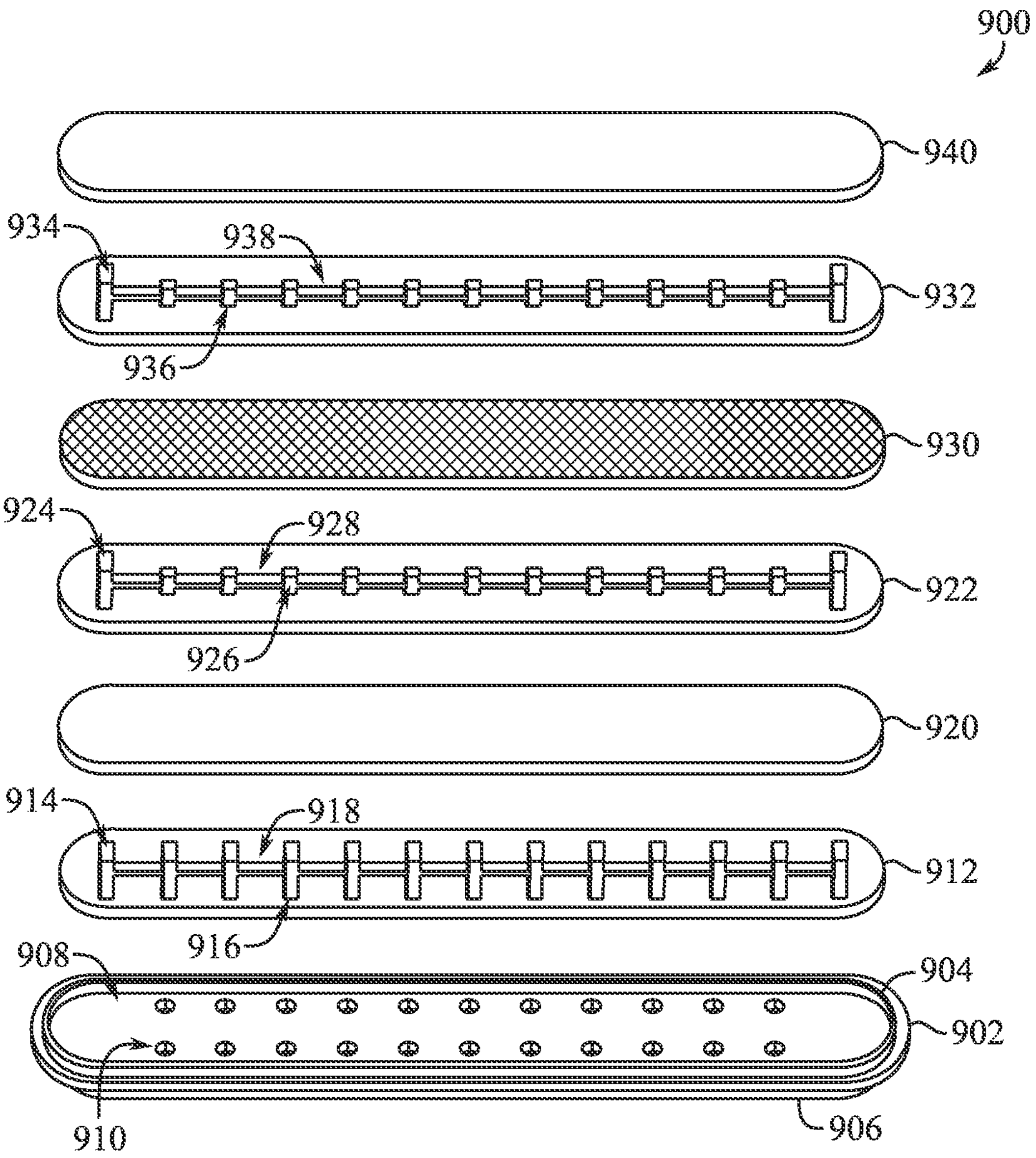
FIG. 9A is an exploded view of a seal for a wearable electronic device.

FIGS. 9A through 9E illustrate an exploded perspective view, a top-down view (with certain features, such as membrane layer, omitted for clarity), a cross-sectional lateral view, an offset cross-sectional longitudinal view, and a central cross-sectional longitudinal view, respectively, of a seal 900 that can be included in an electronic device. As illustrated in FIG. 9A, the seal 900 can include a perforated support 902, an adhesive layer 912 on the perforated support 902, a membrane layer 920 on the adhesive layer 912, an adhesive layer 922 on the membrane layer 920, a mesh layer

930 on the adhesive layer 922, an adhesive layer 932 on the mesh layer 930, and a membrane layer 940 on the adhesive layer 932. The perforated support 902 can include an upper lip 904 defining a recess 908, a lower lip 906 opposite the upper lip 904, and holes 910 extending through the perforated support 902. The perforated support 902 can be the same as or similar to the perforated support 302 described above in reference to FIGS. 3A through 3D.

Figure 9B:
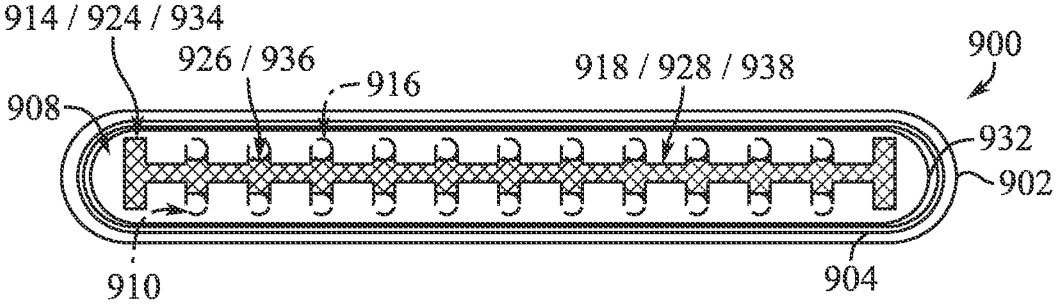
FIG. 9B is a top-down view of a seal for a wearable electronic device.
Figure 9C:
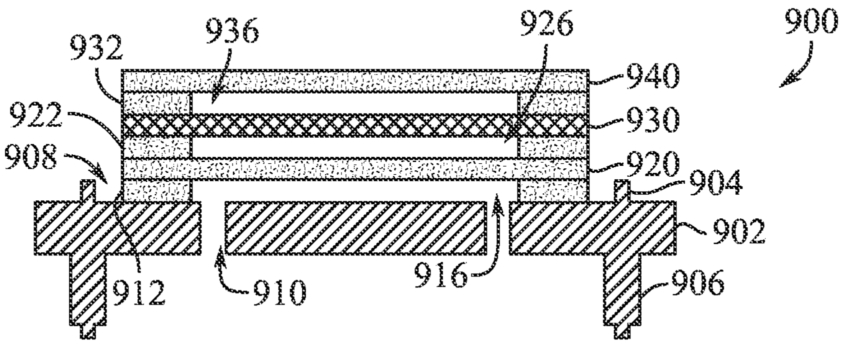
FIG. 9C is a cross-sectional view of a seal for a wearable electronic device.

As illustrated in FIGS. 9A through 9E, the adhesive layer 912 can be provided with lateral slots 914 and 916 and longitudinal slots 918, the adhesive layer 922 can be provided with lateral slots 924 and 926 and longitudinal slots 928, and the adhesive layer 932 can be provided with lateral slots 934 and 936 and longitudinal slots 938. The lateral slots 914, 916, 924, 926, 934, 936 and the longitudinal slots 918, 928, 938 can provide airflow between the respective membrane layers 920, 940; mesh layer 930; and perforated support 902. As illustrated in FIG. 9B, the lateral slots 916, 926, 936 can be aligned with pairs of the holes 910 of the perforated support 902 to provide increased airflow between the holes 910 and an external environment through the adhesive layers 912, 922, 932, the membrane layers 920, 940, and the mesh layer 930. The lateral slots 916, 926, 936 can each extend in a direction parallel to a line extending between a pair of holes 910 located in adjacent rows of the holes 910. The lateral slots 916 of the adhesive layer 912 can have lengths equal to or greater than a distance between outer edges of holes 910 underlying the lateral slots 916, as illustrated in FIGS. 9B and 9C. The lateral slots 926, 936 of the adhesive layer 922, 932 can have lengths less than a distance between inner edges of holes 910 underlying the lateral slots 926, 936. This provides improved protection to the holes 910, as there is not a direct path from the external environment through the membrane layers 920, 940, the mesh layer 930, and the lateral slots 916, 926, 936 to the holes 910. In some examples, both the lateral slots 916, 926, 936 can have lengths equal to or greater than the distance between outer edges of holes 910 or can have lengths less than the distance between inner edges of holes 910.

The lateral slots 914, 924, 934 can be disposed between the lateral slots 916, 926, 936 and longitudinal ends of the seal 900. The lateral slots 914, 924, 934 can have lengths equal to, greater than, or less than the lateral slots 916 and/or the lateral slots 926, 936. The lateral slots 914, 924, 934 can provide increased airflow through the adhesive layers 912, 922, 932.

Figure 9D:
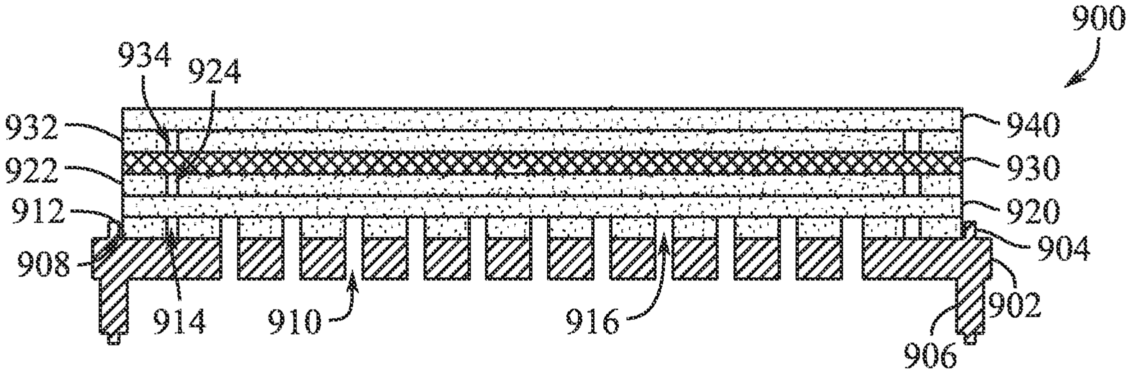
FIG. 9D is a cross-sectional view of a seal for a wearable electronic device.
Figure 9E:
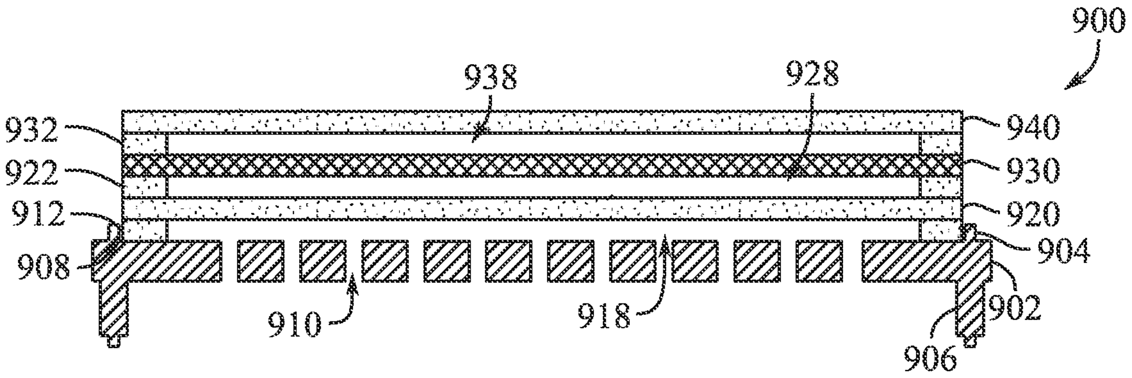
FIG. 9E is a cross-sectional view of a seal for a wearable electronic device.

The longitudinal slots 918, 928, 938 can be disposed between the rows of holes 910. The longitudinal slots 918, 928, 938 can extend between opposite ones of the lateral slots 914, 924, 934, and can have lengths greater than distances between outer edges of peripheral ones of the holes 910 in each row of the holes 910, as illustrated in FIGS. 9B and 9E. The longitudinal slots 918, 928, 938 can provide increased airflow through the adhesive layers 912, 922, 932.

The lateral slots 914, 916, 924, 926, 934, 936 and the longitudinal slots 918, 928, 938 can have widths equal to, greater than, or less than the diameters of the holes 910. For example, as illustrated in FIGS. 9B and 9D, the lateral slots 914, 916, 924, 926, 934, 936 and the longitudinal slots 918, 928, 938 can have widths greater than the diameters of the holes 910. The adhesive layers 912, 922, 932 can provide support the overlying membrane layers 920, 940, and can prevent the membrane layers 920, 940 from sagging, contacting one another, and the like, which helps prevent moisture, contaminants, and the like from penetrating into lower layers, even when upper layers of the seal 900 are compromised.

The mesh layer 930 can provide additional support for the membrane layers 920, 940, can prevent the membrane layers 920, 940 from sagging, ballooning, contacting one another, and the like. This helps prevent moisture, contaminants, and the like from penetrating into lower layers, even when upper layers of the seal 900 are compromised. Further, the mesh layer 930 can help to spread incoming forces across the seal 900 and prevent damage to the seal 900. In some examples, the mesh layer 930 can improve airflow through the seal 900. Although the mesh layer 930 is illustrated as being included between the membrane layers 920, 940, in some examples, the mesh layer 930 can be provided between the perforated support 902 and the membrane layers 920, 940. The mesh layer 930 can protect overlying layers from micro-burrs or the like that can be formed when the holes 910 are formed in the perforated support 902. The mesh layer 930 can be the same as or similar to the mesh layer 822 described above in reference to FIGS. 8A through 8D.

The membrane layers 920, 940 can be the same as or similar to the membrane layers 316, 322, 329 described above in reference to FIGS. 3A through 3D. In some examples, the membrane layer 940 can have a relatively high thickness and low waterproof rating as compared to the membrane layer 920. In some examples, the membrane layer 940 can have a relatively low thickness and high waterproof rating as compared to the membrane layer 920. In some examples, the membrane layers 920, 940 can have the same thicknesses and the same waterproof ratings. As an example, the membrane layer 940 can have a waterproof rating of about 5 bar (or greater than about 5 bar) and a thickness of about 8 μm, and the membrane layer 920 can have a waterproof rating of about 10 bar (or greater than about 10 bar) and a thickness of about 5 μm, about 6 μm, or the like. As an additional example, the membrane layers 920, 940 can have waterproof ratings of about 10 bar (or greater than about 10 bar) and thicknesses of about 5 μm, about 6 μm, or the like. Providing multiple membrane layers 920, 940 with the same or different thicknesses and water protection layers can provide the seal 900 with improved resistance to mechanical damage, chemical contamination, improved water protection, and the like, while allowing for sufficient air flow through the seal 900. This protects underlying devices (e.g., internal components, electronics, or the like) of the electronic device, such as microphones, speakers, processors, and the like, while still allowing sufficient air flow to the underlying devices.

Figure 10A:
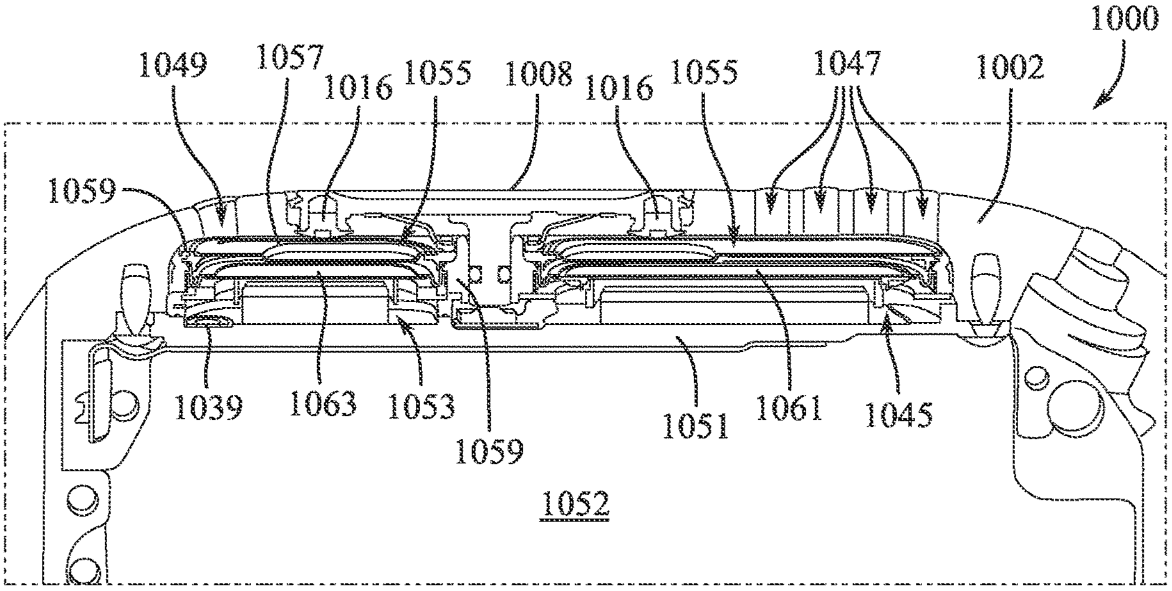
FIG. 10A is a cross-sectional view of a portion of an electronic device.

FIG. 10A shows an example of an electronic device 1000 that includes an outer housing 1002 defining an internal volume 1052. A first speaker 1063 and a second speaker 1061 are disposed in the internal volume 1052. The first speaker 1063 includes a speaker frame 1059 disposed around a periphery of a diaphragm 1057 of the first speaker 1063. A front volume 1055 is defined by the outer housing 1002, the first speaker 1063, and the second speaker 1061. A first back volume 1053 is defined by the first speaker 1063 and the speaker frame 1059. A second back volume 1045 is defined by the second speaker 1061 and the speaker frame 1059. In some examples, the second back volume 1045 can be connected with the internal volume 1052 and/or the first back volume 1053. In some examples, the first back volume 1053 can be connected with the internal volume 1052.

In some examples, the electronic device 1000 can include an inner housing 1051 spaced apart from the outer housing 1002 and a speaker assembly disposed between the inner housing 1051 and the outer housing 1002. The speaker assembly can include the first speaker 1063, the second speaker 1061, and the speaker frame 1059 that supports the first speaker 1063. The first back volume 1053 of the electronic device 1000 can be defined by the inner housing 1051 and the first speaker 1063. The second back volume 1045 can be defined by the inner housing 1051 and the second speaker 1061. The second back volume 1045 can be separated from the first back volume 1053 by the speaker frame 1059.

The front volume 1055 of the electronic device 1000 can be defined by the outer housing 1002 and the speaker assembly. The back volume can be defined by the inner housing 1051 and the speaker assembly, and can be separated into the first back volume 1053 and the second back volume 1045. In some examples, the electronic device 1000 can include a first vent 1049 defined by the outer housing 1002 through which a first end of the front volume 1055 is in fluid communication with an external environment, and a second vent 1047 defined by the outer housing 1002 through which a second end of the front volume 1055 is in fluid communication with the external environment.

In some examples, the front volume 1055 can be isolated from the first back volume 1053 and the second back volume 1045. The first speaker 1063 can be disposed between the front volume 1055 and the first back volume 1053. The second speaker 1061 can be disposed between the front volume 1055 and the second back volume 1045. The speaker frame 1059 can structurally support the first speaker 1063. In some examples, the speaker frame 1059 forms an air-tight seal between the first back volume 1053 and the second back volume 1045. In addition, as noted above, the inner housing 1051 can at least partially define the first back volume 1053. The speaker frame 1059 can include a collar 1043 and a molded seal 1041 extending from the collar 1043 toward the internal volume 1052 and contacting the inner housing 1051. The molded seal 1041 can seal the first back volume 1053 as shown behind/below the first speaker 1063. The collar 1043 can include a metal ring disposed around the first speaker 1063 and configured to redirect magnetic flux around the first speaker 1063. In some examples, the speaker frame 1059 can also structurally support the second speaker 1061.

In some examples, the first speaker 1063 can be smaller than the second speaker 1061. The first speaker 1063 can be referred to as a tweeter and be configured to output higher frequency sound waves than the larger second speaker 1061. Accordingly, to accommodate the smaller volumetric air displacement caused by the first speaker 1063, in some examples, the first back volume 1053 can be smaller than the second back volume 1045.

Figure 10B:
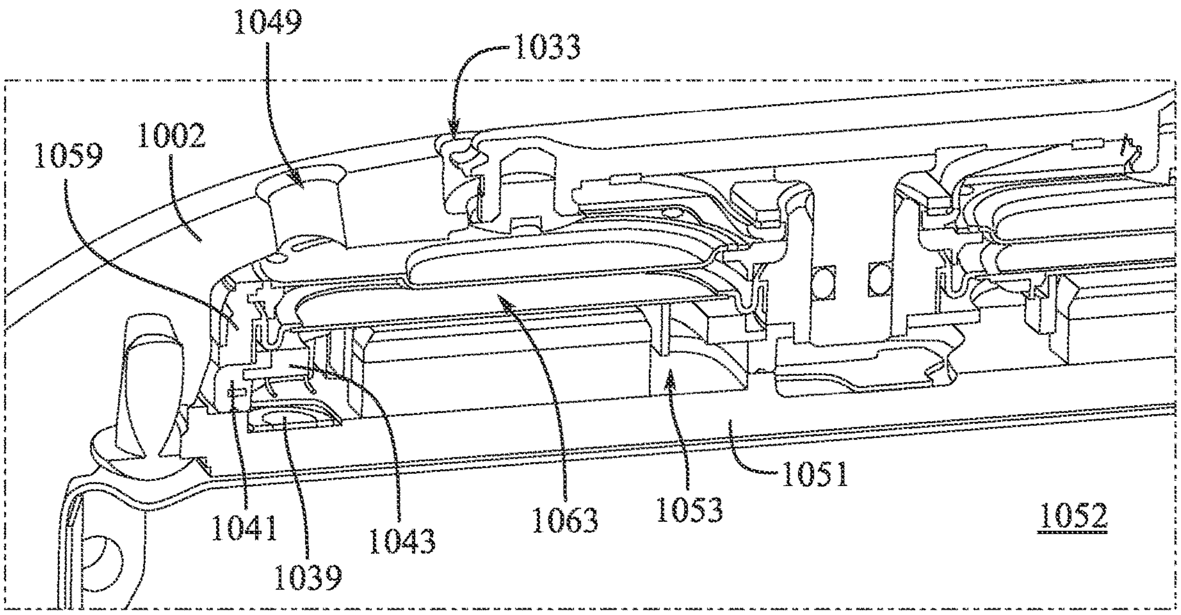
FIG. 10B is a close-up view of a portion of the electronic device of FIG. 10A.

As shown in FIGS. 10A and 10B, the electronic device 1000 can include a valve 1039 disposed in an aperture defined by the inner housing 1051. The valve 1039 can vent air from the first back volume 1053 to the internal volume 1052. In some examples, the valve 1039 can be configured to equalize pressure between the internal volume 1052 and the first back volume 1053. In some examples, the valve 1039 can include a mesh and a channel passing through and defined by the inner housing 1051.

The front volume 1055 can be in fluid communication with an external environment through various vents passing through the outer housing 1002. The location and configuration of each vent can be designed to accommodate high siren-type frequencies output by the smaller tweeter speaker (e.g., the first speaker 1063) and lower frequencies output by the second speaker 1061. In this way, a broader range of frequencies can be output by the speaker assembly clearly and effectively.

In some examples, the first vent 1049 is formed by a single aperture defined by the outer housing 1002. The second vent 1047 can include two or more apertures defined by the outer housing 1002. In some examples, a distance between any two adjacent apertures of the second vent 1047 can be less than a distance between any aperture of the second vent 1047 and the single aperture of the first vent 1049.

As noted above, the arrangement and configuration of the speaker assembly of the electronic device 1000 shown in FIGS. 10A and 10B enables the speaker assembly to output frequencies in the normal range of daily use. This can include music, voice, and other typical audio outputs, as well as loud, high-frequencies, such as frequencies in the range of above 3 kHz, 3.5 kHz, or even above 4.5 kHz. The high-frequency outputs can be output from the first speaker 1063, such as to be used as a siren. The siren can be used in conjunction with a fall-detection system of the electronic device 1000 to alert others if the user has fallen or been injured. During some activities, for example during mountain biking, the siren can output warning signals when coming around a blind corner on a trail or the like. A guardian mode of the electronic device 1000 could activate the siren as an assault whistle or a mugging deterrent.

In order to fit the dual speaker assembly within a tight space between the inner housing 1051 and the outer housing 1002 of the electronic device 1000, some of the components discussed above and shown in FIGS. 10A and 10B are configured to interface with and be disposed with other component of the electronic device 1000 to form a tight, compact, space-saving electronic device 1000. For example, the speaker assembly shown in FIGS. 10A and 10B can be disposed within the electronic device 1000 in generally the same location as a button 1008 of the electronic device 1000, such that the button 1008 and the speaker assembly share the same location or portion of the internal volume 1052 of the electronic device 1000. In such an example, the button may include one or more components disposed between through, or with one or more components of the speaker assembly.

Figure 10C:
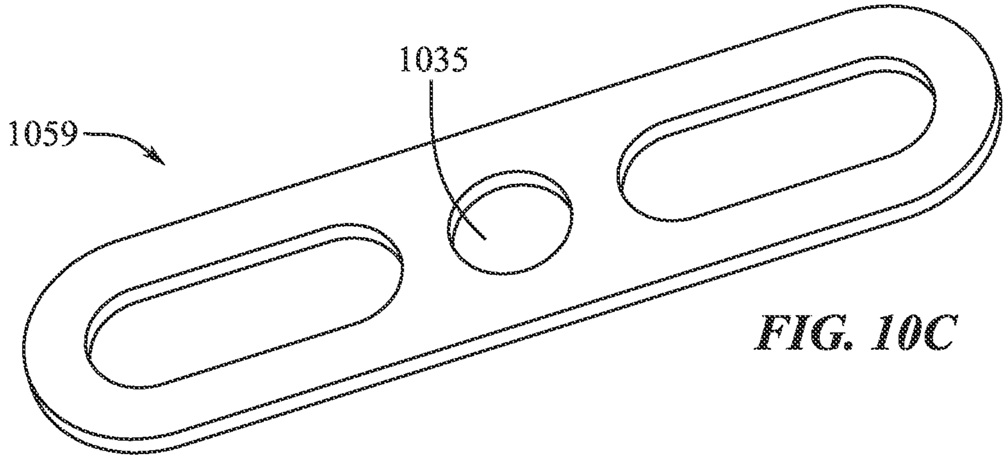
FIG. 10C is a perspective view of a speaker frame.
Figure 10D:
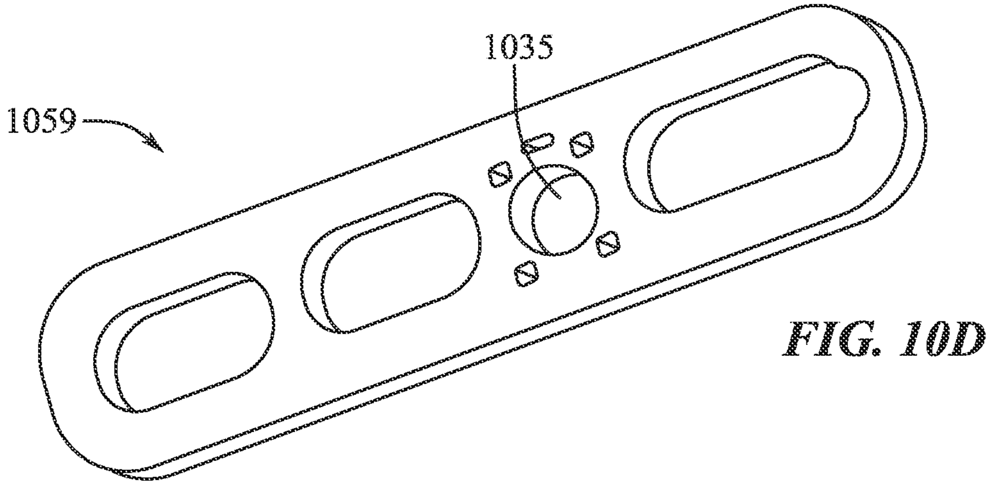
FIG. 10D is a perspective view of a speaker frame.
Figure 10E:
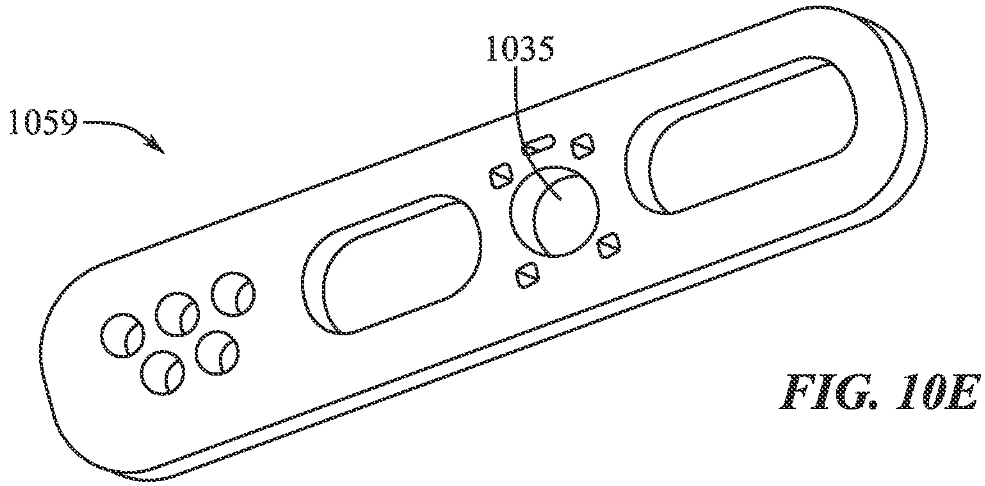
FIG. 10E is a perspective view of a speaker frame.
Figure 10F:
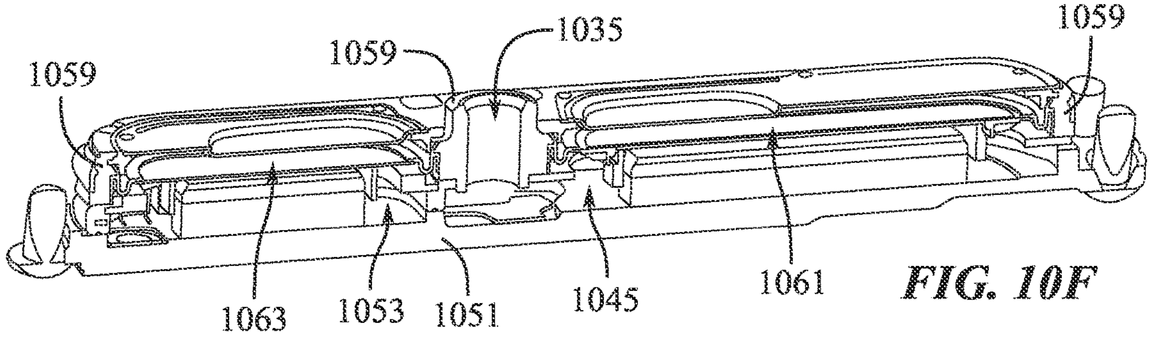
FIG. 10F is a cut-away view of a speaker assembly of an electronic device.
Figure 10G:
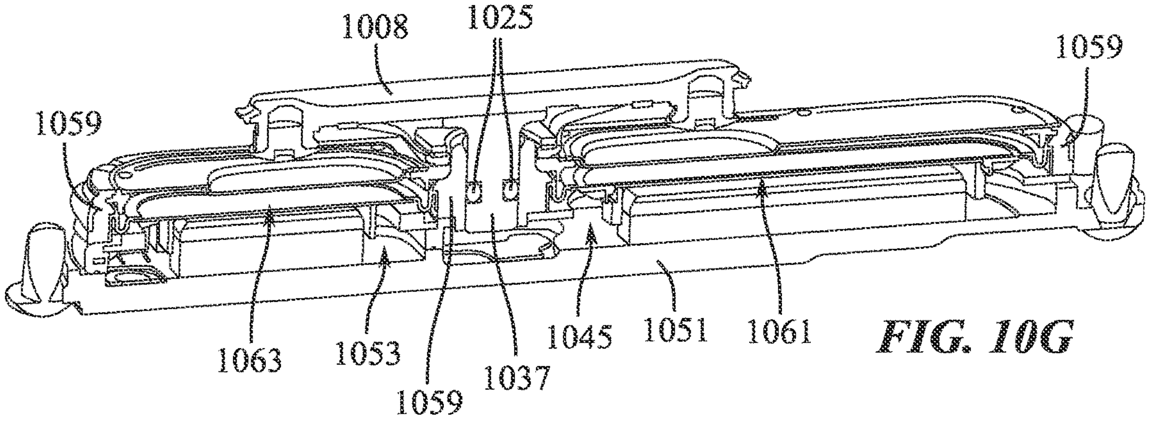
FIG. 10G is a cut-away view of the speaker assembly of FIG. 10F with a button.

In order to accommodate the speaker assembly and the button together 1008 in the same area, the speaker frame 1059, as shown in FIGS. 10C through 10EC, can include an opening 1035 defined by the speaker frame 1059. The opening 1035 can be positioned to receive one or more components of the button 1008 that pass through the speaker frame 1059. FIG. 10F illustrates the speaker frame 1059 supporting the first speaker 1063 and the second speaker 1061 and defining the opening 1035. The opening 1035 can be defined/disposed between the first speaker 1063 and the second speaker 1061. As shown in FIG. 10G, the button 1008 can include a plunger 1037 that is aligned with and/or extends through the opening 1035 between the first speaker 1063 and the second speaker 1061.

In some examples of the electronic device 1000, the outer housing 1002 can define the internal volume 1052 and an aperture 1033, as illustrated in FIG. 10B. The button 1008 can be disposed in the aperture 1033. The button 1008 can include the plunger 1037 extending into or toward the internal volume 1052 and the speaker frame 1059 can be disposed in the internal volume 1052 and define the opening 1035. In such an example, the plunger 1037 can extend through the opening 1035.

In some examples, the speaker frame 1059 can structurally support the first speaker 1063 and the second speaker

1061. The speaker frame 1059 can be disposed in the internal volume 1052 with the speaker frame 1059 defining the opening 1035 (otherwise referred to herein as a "hole") between the first speaker 1063 and the second speaker 1061. In some examples, the speaker frame 1059 can include one or more components. For example, the speaker frame 1059 can include a molded portion that surrounds or encircles the first speaker 1063 and the second speaker 1061. The molded portion of the speaker frame 1059 can be formed of plastic or the like. The speaker frame 1059 can further include a grill portion that covers and protects the first speaker 1063 and the second speaker 1061. As will be discussed in greater detail below, a speaker mesh can be attached to the grill portion. The grill portion of the speaker frame 1059 can be formed of metals or the like.

In some examples, the plunger 1037 can be aligned with the hole/opening 1035. A portion of the internal volume 1052 between the inner housing 1051 and the speaker frame 1059, spaced part from the outer housing 1002, can define a speaker volume. The speaker volume can include the front volume 1055, the first back volume 1053, and the second back volume 1045. The plunger 1037 can be aligned with the opening 1035 and extend into the speaker volume toward the inner housing 1051.

In some examples, the speaker frame 1059 supports the first speaker 1063 and the second speaker 1061 and the opening 1035 is defined between the first speaker 1063 and the second speaker 1061. Accordingly, in some examples, the plunger 1037 extends between the first speaker 1063 and the second speaker 1061. In some examples, the plunger 1037 can extend through the front volume 1055 and into the back volume, such as the first back volume 1053 and/or the second back volume 1045.

In order to seal off the front volume 1055 from the first back volume 1053 and/or the second back volume 1045, the electronic device 1000 can include a gasket 1025 surrounding the plunger 1037 and forming a fluid-tight seal between the speaker frame 1059 and the plunger 1037. Thus a fluid-tight seal is formed by the gasket 1025 between the front volume 1055 and the first back volume 1053 and/or the second back volume 1045. In some examples, the gasket 1025 can include an O-ring disposed around the plunger 1037. The plunger 1037 can define a recess in which the O-ring can be disposed and positioned between the plunger 1037 and the speaker frame 1059. The materials, size, and shape of the gasket 1025 can be selected to keep fluid out of the volumes surrounding the first speaker 1063 and the second speaker 1061 and to tune the tactile sensation experienced by the user when depressing the button 1008.

Figure 10H:
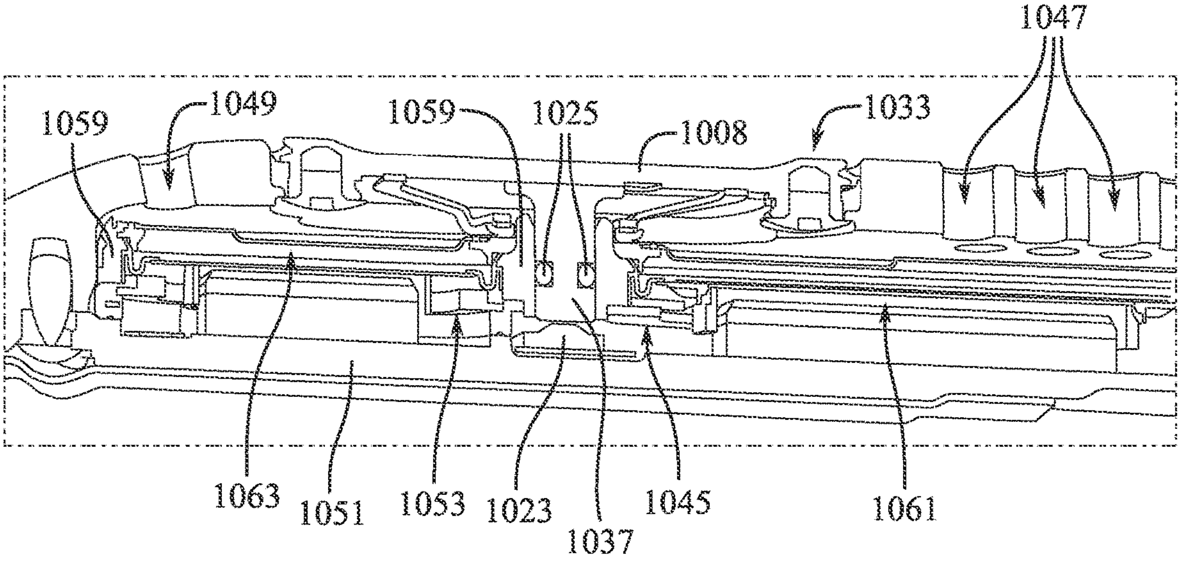
FIG. 10H is a cut-away view of the speaker assembly of FIG. 10G.

In addition, as the button 1008 is pressed downward, the plunger 1037 can make contact with an electrical contact 1023 disposed on the inner housing 1051, as shown in at least FIG. 10H. The plunger 1037 is aligned with the electrical contact 1023 so that an electrical pathway or circuit can be completed between the plunger 1037 and the electrical contact 1023 when the button 1008 is pressed down during operation. Accordingly, the plunger 1037 can include or be formed from an electrically conductive material.

Any of the features, components, and/or parts, including the arrangements and configurations thereof shown in FIGS. 10A through 10H can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 10A through 10H.

Figure 10I:
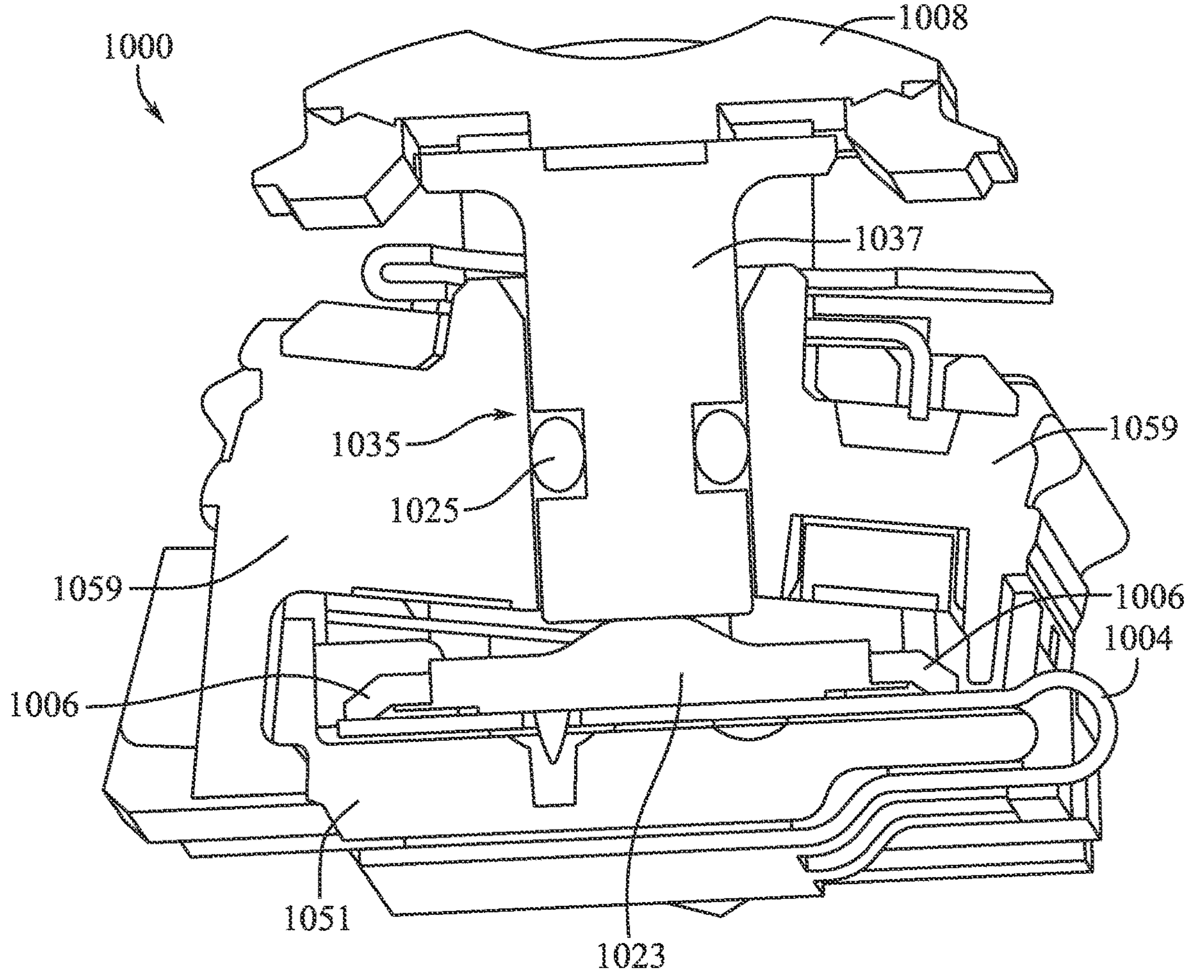
FIG. 10I is a cut-away view of the speaker and button assembly of FIG. 10G.

FIG. 10I illustrates a side, cross-sectional view of a portion of the electronic device 1000 showing a viewing plane orthogonal to the cross-sectional viewing plane of FIG. 10H and extending through the plunger 1037. FIG. 10I shows the button 1008 and the plunger 1037 extending through the opening 1035 defined by the speaker frame 1059. As illustrated, a lower surface of the plunger 1037 presses against or contacts the electrical contact 1023 when the button 1008 is depressed to complete an electrical circuit between the plunger 1037 and the electrical contact 1023. When the button 1008 is not depressed, the plunger 1037 and the electrical contact 1023 are separated so that no electrical connection is made therebetween. The electrical contact 1023 can also be referred to herein as a "tactile switch" or a "tac switch."

The electrical contact 1023 can electrically couple and/or physically contact an electrical flex 1004, which can be partially disposed on a top surface of the inner housing 1051 and at least partially extending under the electrical contact 1023 between the electrical contact 1023 and the inner housing 1051. The flex 1004 can extend around an edge of the inner housing 1051 and continue underneath or on a lower surface, opposite the top surface of the inner housing 1051, as shown. In some examples, the bend formed in the flex 1004 as the flex 1004 rounds the edge of the inner housing 1051 from one surface to the other can, on its own, bias the portion of the flex 1004 disposed between the electrical contact 1023 and the inner housing 1051 away from the inner housing 1051.

In order to counteract this biasing force away from the inner housing 1051, the electronic device 1000 can include a foot 1006 pressing downward onto the flex 1004 to keep the flex 1004 in position between the electrical contact 1023 and the inner housing 1051, as shown in FIG. 10I. The foot 1006 can be a molded plastic piece or other non-conductive material anchored to the speaker frame 1059, the inner housing 1051, or another component to produce the force of the foot 1006 pressing the flex 1004 against the inner housing 1051, as shown. In some examples, the foot 1006 can also engage the electrical contact 1023 such that the foot 1006 presses the electrical contact 1023 against or toward the flex 1004 and/or the inner housing 1051. Additionally or alternatively, one or more adhesives or adhesive layers can be disposed between the flex 1004 and the inner housing 1051, between the electrical contact 1023 and the flex 1004, and/or between the electrical contact 1023 and the inner housing 1051, to maintain the flex 1004 and the electrical contact 1023 in position as shown in FIG. 10I.

Any of the features, components, and/or parts, including the arrangements and configurations thereof shown in FIG. 10I can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 10I.

Figure 10J:
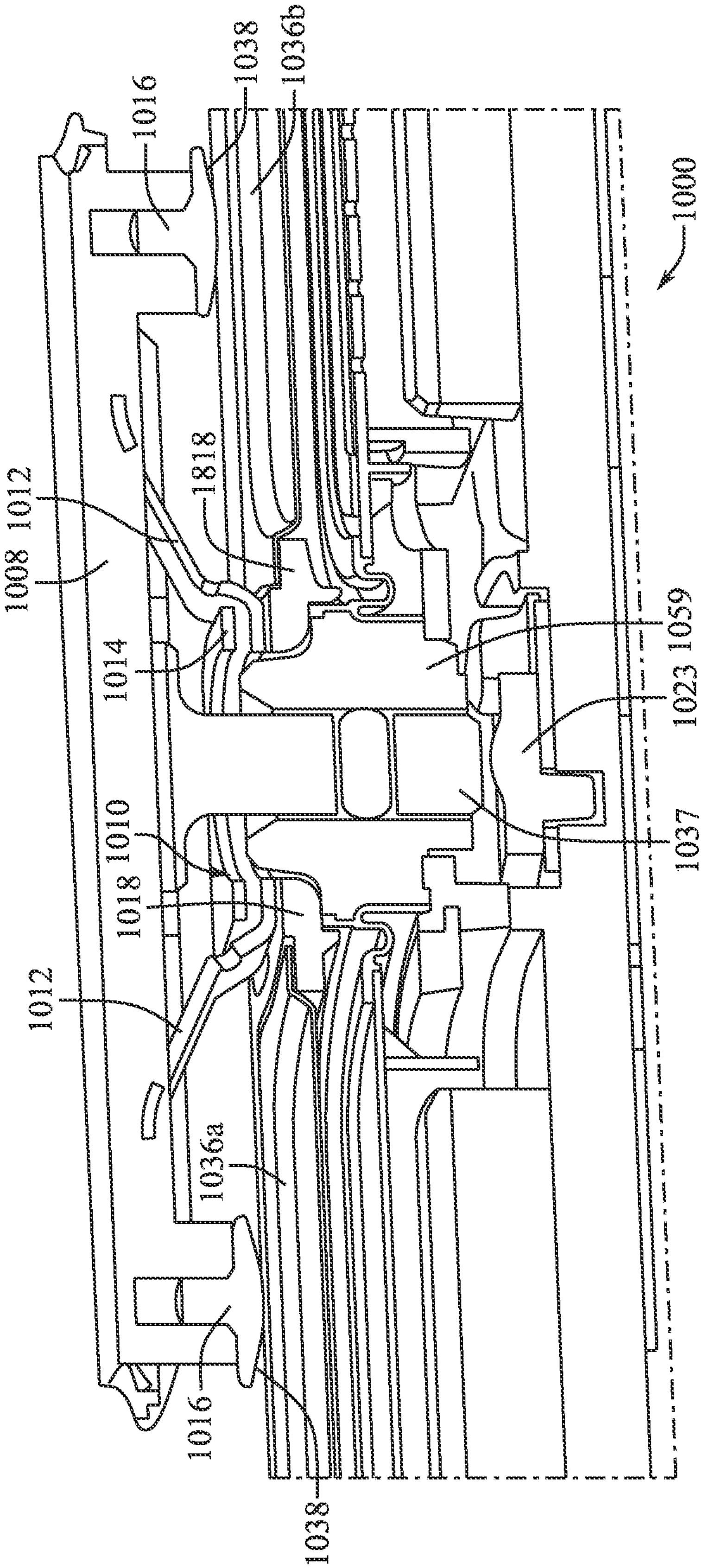
FIG. 10J is a cut-away view of the speaker and button assembly of FIG. 10G.

FIG. 10J shows another example of a portion of an electronic device 1000, including a button 1008 and a button spring 1010. In some examples, the button spring 1010 can include upwardly extending spring arms 1012 fixed to the button 1008. The button spring 1010 and the spring arms 1012 can be formed of a conductive material, including metal, and can be shaped so as to provide an upward biasing force against the button 1008. The button spring 1010 can include a lower portion 1014 anchored to the speaker frame 1059 or other component of the electronic device 1000 relative to which the button 1008 travels when depressed. In some examples, the button spring 1010 provides a constant force to maintain an upper/outer surface of the button 1008 flush with an outer surface of the outer housing 1002 of the electronic device 1000 (not separately illustrated in FIG. 10J, but illustrated in at least FIGS. 10A and 10B). The materials, shapes, lengths of the spring arms 1012, and other factors of the button spring 1010 can be tuned to alter the tactile response of the button 1008 when depressed by the user.

Referring briefly to FIG. 10A, when the button 1008 is not depressed, an electrical grounding path can be formed through one or more screws 1016 contacting a portion of the outer housing 1002. Accordingly, the screws 1016 and the outer housing 1002 can be formed of electrically conductive materials. The screws 1016 can act as a stop feature or datum contacting an inner surface of the outer housing 1002 to prevent the button 1008 from extending beyond the outer housing 1002 and maintaining a flush external surface with the outer housing 1002. Referring again to FIG. 10J, when the button 1008 is partially depressed, the screws 1016 separate from the outer housing 1002, but the plunger 1037, which is also in electrical communication with the button 1008, is not yet in electrical contact with the electrical contact 1023.

Figure 10K:
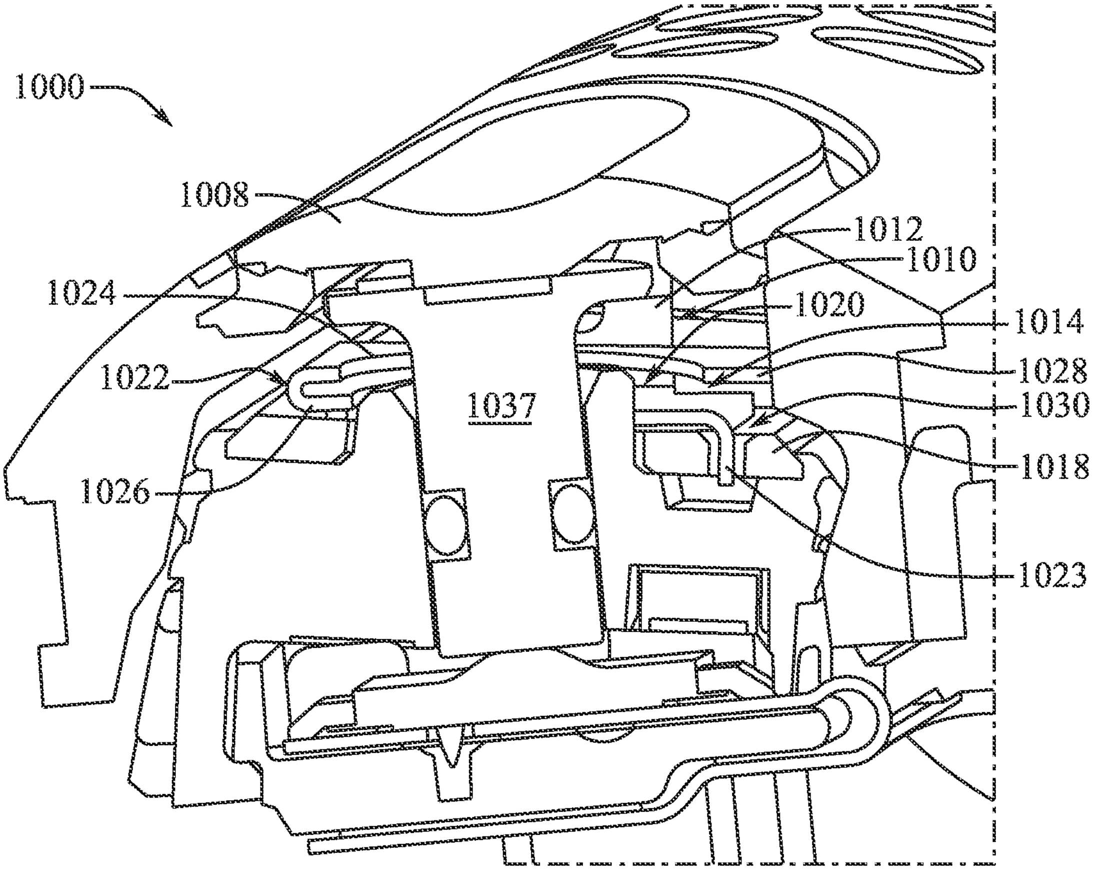
FIG. 10K is a cut-away view of the speaker and button assembly of FIG. 10H.

As shown in FIG. 10K, in this partially depressed position of the button 1008, the button spring 1010 can form an electrical grounding pathway between a grounding component or plane of the electronic device 1000 and the button 1008. The button spring 1010 can form such a grounding pathway with the button 1008 whether the button 1008 is fully depressed to contact the plunger 1037 against the electrical contact 1023, partially depressed as discussed above, or when not depressed. The lower portion 1014 of the button spring 1010 can electrically contact or couple to a collar 1018, which can be coupled to ground, or one or more other components forming the grounding pathway. The spring arms 1012 can contact the button 1008 as shown in FIG. 10J to complete the pathway to the button 1008.

In at least one example, the lower portion 1014 of the button spring 1010 defines an aperture 1020 through which the plunger 1037 extends. In at least one example, the lower portion 1014 of the button spring 1010 forms a bend 1022 that biases portions of the button spring 1010 on either side of the bend 1022 away from each other, contributing to the upward force from the button spring 1010. For example, the bend 1022 can bias a first portion 1024 on one side of the bend 1022 away from a second portion 1026 on the other side of the bend 1022.

In at least one example, the first portion 1024 contacts or extends into the outer housing 1002 at 1028 to complete an electrical pathway from the button 1008, through the button spring 1010, to the outer housing 1002. In some examples, the collar 1018 defines an aperture 1030 and an anti-rotation feature or extension 1032 of the second portion 1026 can extend through the aperture 1030 or at least partially into the aperture 1030 to prevent the button spring 1010 from rotating out of position as the button 1008 is depressed and travels up and down during use. In some examples, the anti-rotation feature 1032 engages the collar 1018 without adhesives. In general, the button spring 1010 can be disposed and fixed in position as shown without adhesives. The area or volume in which the button spring 1010 is disposed can include an area between the inner housing 1051 and the outer housing 1002 such that any adhesives present could be exposed to chemical aggressors from the external environment, for example through the various vents defined by the outer housing 1002, including the first vent 1049 and the second vent 1047. Thus, the button spring 1010 can be fixed in position via the anti-rotation feature 1032, an interface with the outer housing 1002 at 1028, and/or with the button 1008.

Referring back to FIG. 10J, the electronic device 1000 can include speaker meshes 1036*a*, 1036*b* disposed over the first speaker 1063 and the second speaker 1061, respectively. Each screw 1016 of the button 1008 can include a lower surface 1038 of the screw head facing the respective speaker mesh 1036*a*, 1036*b*. The lower surface 1038 can be chamfered. The speaker meshes 1036*a*, 1036*b* can be recessed to match or accommodate the curvature of the lower surfaces 1038 of the screws 1016. The recessed geometry of the speaker meshes 1036*a*, 1036*b* can provide extra space or volume into which the screws 1016 can extend toward the speaker meshes 1036*a*, 1036*b* without the screws 1016 and the speaker meshes 1036*a*, 1036*b* contacting or colliding when the button 1008 is depressed. Additionally, the speaker meshes 1036*a*, 1036*b* can include any number of stacked meshes of varying pore size and material. Pore size can be identified and selected to balance the resistance to ingress of foreign materials, cosmetic benefits, water ejection, and acoustic performance. In some examples, the speaker meshes 1036*a*, 1036*b* can both be metal and be welded to the electronic device 1000. In some examples, the speaker meshes 1036*a*, 1036*b* can be metal, fabric, polymer, or a combination thereof, and can be attached to the electronic device 1000 by adhesives, fasteners, welding or other joining methods, and the like. As will be discussed in detail in reference to FIGS. 12A through 12F, in some examples, the speaker meshes 1036*a*, 1036*b* can be attached to the electronic device 1000 through a combination of welds and adhesives (e.g., epoxies). Attaching the speaker meshes 1036*a*, 1036*b* to the electronic device 1000 by adhesives in addition to welds distributes forces across the speaker meshes 1036*a*, 1036*b* and allows for flexibility between the speaker meshes 1036*a*, 1036*b* and the electronic device 1000. This reduces the likelihood of detachment and damage to the speaker meshes 1036*a*, 1036*b* resulting from impacts.

Any of the features, components, and/or parts, including the arrangements and configurations thereof shown in FIGS. 10J and 10K can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 10J and 10K.

Figure 10L:
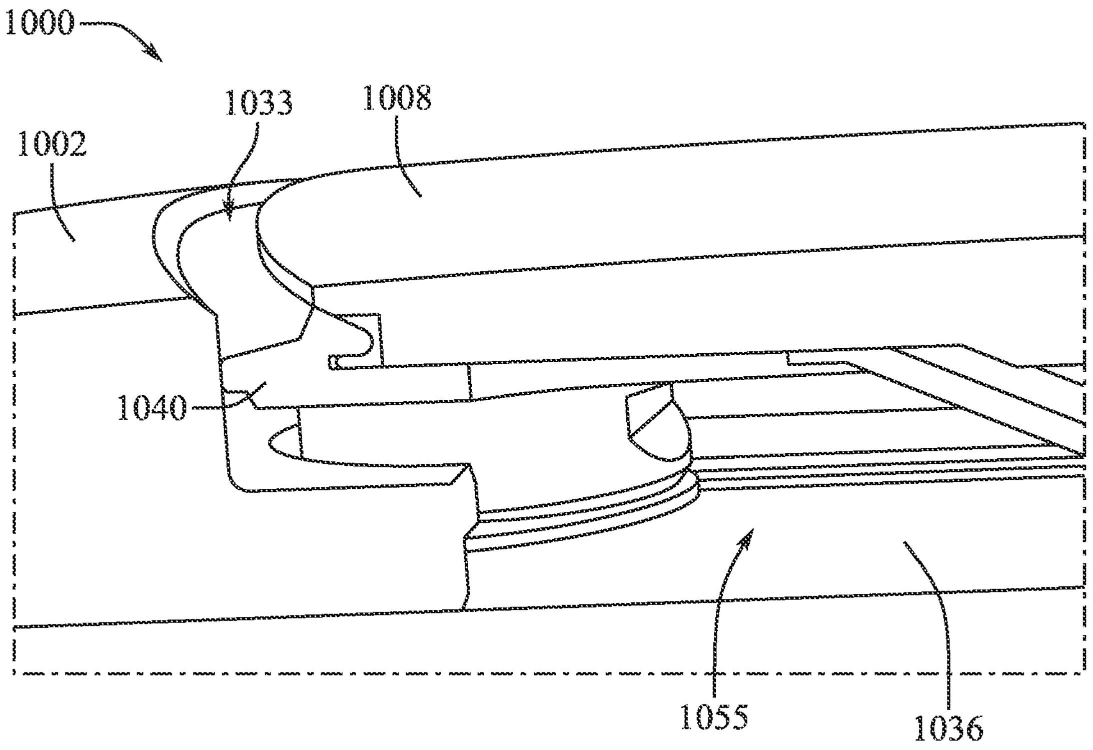
FIG. 10L is a cut-away view of the speaker and button assembly of FIG. 10H.

FIG. 10L shows a cross-sectional view of a portion of an electronic device 1000, including a button 1008 disposed in an aperture 1033 defined by an outer housing 1002 and a speaker diaphragm 1036 disposed in an internal volume of the electronic device 1000. The speaker diaphragm 1036, the button 1008, and the outer housing 1002 can define a front volume 1055, which is also shown and labeled in FIG. 10A. In some examples, the electronic device 1000 can include an acoustic gasket 1040 extending between the button 1008 and the outer housing 1002. In some examples, the acoustic gasket 1040 is greater than or equal to about 100 microns thick where the acoustic gasket 1040 contacts the outer housing 1002. In some examples, an upper surface of the acoustic gasket 1040 interfaces at an angle with the vertical surface of the outer housing 1002 defining the aperture 1033 at greater than 0-degrees, for example at least about 20-degrees or more relative to the horizontal plane orthogonal to the surface of the outer housing 1002 defining the aperture 1033. In some examples, the acoustic gasket 1040 includes an elastic material. In some examples, the acoustic gasket 1040 includes a material with a Shore-A hardness of between about 30 A and 90 A, or between about 40 A and 80 A, or between about 50 A and 70 A, for example about 60 A.

The acoustic gasket 1040 having the above-noted dimensions and material properties can maintain and rebound to its resting shape after the button 1008 is depressed by the user. In addition, the acoustic gasket 1040 can seal the front volume 1055 such that pressure can build up greater than an atmospheric pressure external to the electronic device 1000. In this way, the volume of the first speaker 1063 can be increased. In some examples, the material properties, shape, and dimensions of the acoustic gasket 1040 can be tuned to maximize at least one of the resonant frequencies of the first speaker 1063. In some examples, the acoustic gasket 1040 can be permeable to water but impermeable to dust and debris from the external environment.

The first speaker 1063 can include two peak resonance frequencies, a mechanical resonant frequency generated by shape of the first speaker 1063 itself operating in open air and front port resonance leveraging the length of the first vent 1049 as a tube that creates a higher pitch frequency and lets sound out from the first speaker 1063 through the outer housing 1002. The pressure built up in the front volume 1055, in part due to the seal formed by the acoustic gasket 1040, affects the pressure waves of sound from the first speaker 1063 exiting the first vent 1049. In this way, the acoustic gasket 1040 can tune the sound from the first speaker 1063 and increase the resonant tube frequency. Thus, multiple resonant frequencies (mechanical and tube) can be utilized and a broader range of sound frequencies can be increased.

Any of the features, components, and/or parts, including the arrangements and configurations thereof shown in FIG. 10L can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 10L.

Figure 11A:
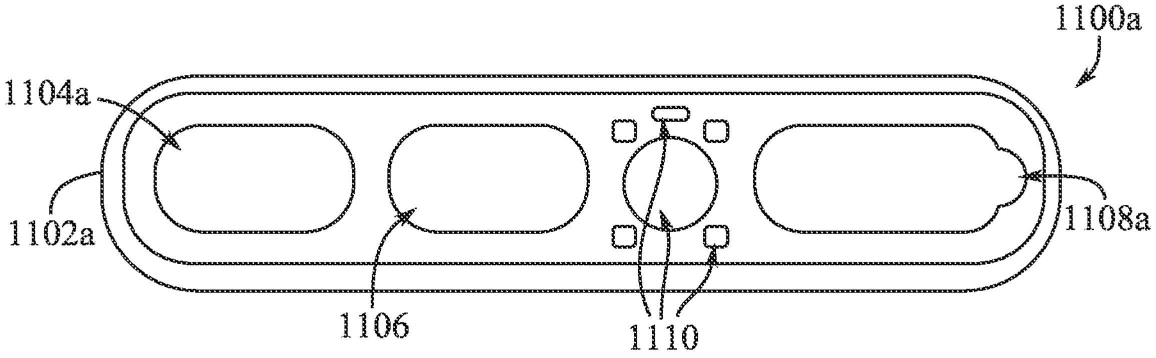
FIG. 11A is a front view of a speaker frame.
Figure 11B:
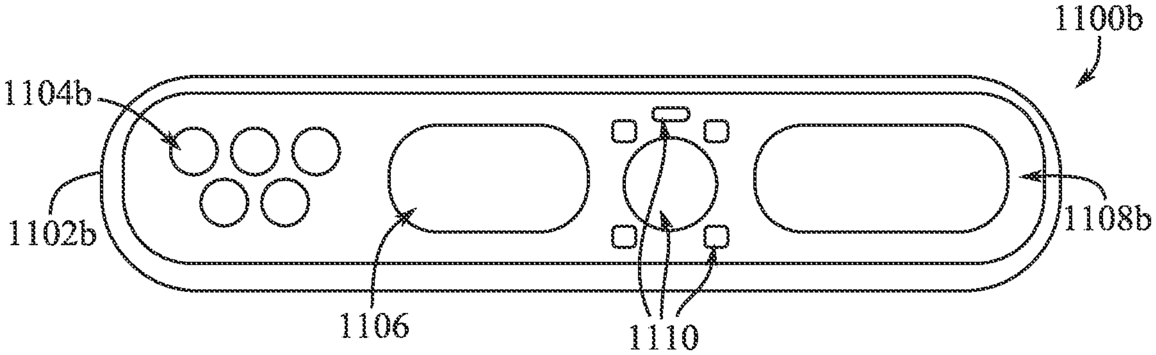
FIG. 11B is a front view of a speaker frame.

FIGS. 11A and 11B illustrate speaker frames 1100*a* and 1100*b*, respectively, according to some examples. The speaker frames 1100*a*, 1100*b* can have different configurations to provide improved support to a speaker mesh attached to the speaker frames 1100*a*, 1100*b* (e.g., to prevent the speaker mesh from deforming, tearing away, or the like as a result of a high-velocity impact), to provide different air flow to one or more speakers, to provide different levels of protection to the speakers, and the like. In FIG. 11A, the speaker frame 1100*a* includes a body portion 1102*a*. A first speaker opening 1104*a*, a second speaker opening 1106, a third speaker opening 1108*a*, and button openings 1110 extend through the body portion 1102*a*. In FIG. 11B, the speaker frame 1100*b* includes a body portion 1102*b*. First speaker openings 1104*b*, a second speaker opening 1106, a third speaker opening 1108*b*, and button openings 1110 extend through the body portion 1102*a*. One or more speakers can be disposed adjacent the first speaker openings 1104*a*, 1104*b*, the second speaker openings 1106, and/or the third speaker openings 1108*a*, 1108*b*. Various components of a button, such as a button the same as or similar to the button 1008 discussed above with respect to FIGS. 10A through 10L, can extend through the button openings 1110. In some examples, the button can extend through the button openings 1110 between at least two speakers disposed adjacent the first speaker openings 1104*a*, 1104*b*, the second speaker openings 1106, and/or the third speaker openings 1108*a*, 1108*b*.

In the example of FIG. 11A, the first speaker opening 1104*a*, the second speaker opening 1106, and the third speaker opening 1108*a* are stadium-shaped, with the third speaker opening 1108*a* having a semi-circular bump-out. The configuration of FIG. 11A may be used to increase air flow through the speaker frame 1100*a* between speakers disposed adjacent the first speaker opening 1104*a*, the second speaker opening 1106, and/or the third speaker opening 1108*a* and an external environment. In some examples, the semi-circular bump-out can be included in the third speaker opening 1108*a* to provide a channel between a speaker disposed adjacent the third speaker opening 1108*a* and an aperture in an outer housing. In some examples, the semi-circular bump-out can be included in the third speaker opening 1108*a* to provide a path for water to flow out of a speaker front volume disposed adjacent the third speaker opening 1108*a* and out of an outer housing to an external environment. For example, the aperture in the housing can be disposed outside the stadium-shaped portion of the third speaker opening 1108*a*, and the semi-circular bump-out can provide a channel through the third speaker opening 1108*a* between the speaker disposed adjacent to the third speaker opening 1108*a* and the aperture in the housing.

In the example of FIG. 11B, the first speaker openings 1104*b* include five circular openings, and the second speaker opening 1106, and the third speaker opening 1108*b* are stadium-shaped. Although the first speaker openings 1104*b* are illustrated as including five circular openings, any number of openings, such as more or less openings, can be provided. In some examples, the first speaker openings 1104*b* can correspond to openings provided in an outer housing of an electronic device. The configuration of FIG. 11B may be used to provide increased protection by the speaker frame 1100*a* to the speakers disposed adjacent the first speaker openings 1104*b*, the second speaker opening 1106, and/or the third speaker opening 1108*b* from damage, contaminants, and the like. Further, as will be discussed in detail below with respect to FIGS. 12A through 12F, one or more meshes can be attached over one or more of the first speaker openings 1104*b*, the second speaker opening 1106, and/or the third speaker opening 1108*b*, and the configuration of FIG. 11B can provide increased support to the meshes. This prevents damage, tearing, detachment, and the like of the meshes from the body portion 1102*b* of the speaker frame 1100*b*.

Figure 12A:
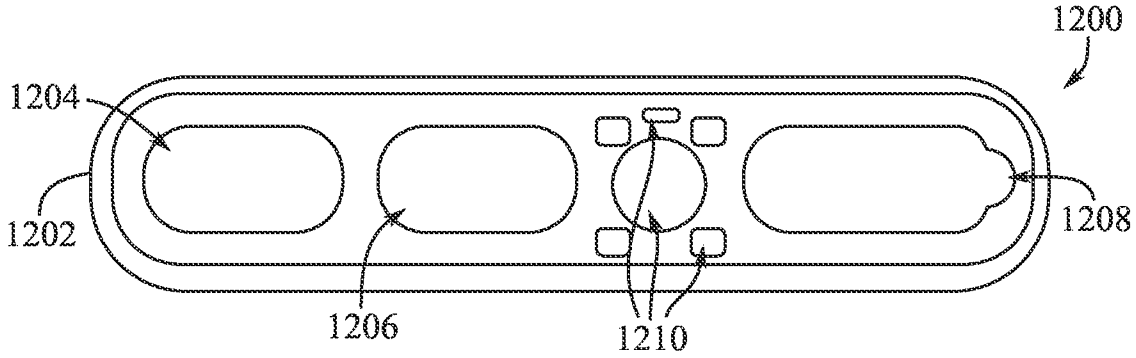
FIGS. 12A, 12B, 12C, 12D, and 12E are front views of mesh attached to a speaker frame and the speaker frame attached to a housing of an electronic device.

FIGS. 12A through 12F illustrate a method of attaching meshes 1212 and 1214 (illustrated in FIGS. 12B and 12F) to a speaker frame 1200 and attaching the speaker frame 1200 to an outer housing (illustrated in FIGS. 12E and 12F) of an electronic device. In FIG. 12A, a speaker frame 1200 including a body portion 1202 and a first speaker opening 1204, a second speaker opening 1206, a third speaker opening 1208, and button openings 1210 extending through the body portion 1202 is provided. The speaker frame 1200 can be the same as or similar to the speaker frame 1100*a* discussed above with respect to FIG. 11A. As illustrated in FIG. 12A, the first speaker opening 1204, the second speaker opening 1206, and the third speaker opening 1208 can be stadium-shaped, with the third speaker opening 1208 having a semi-circular bump-out.

Figure 12B:
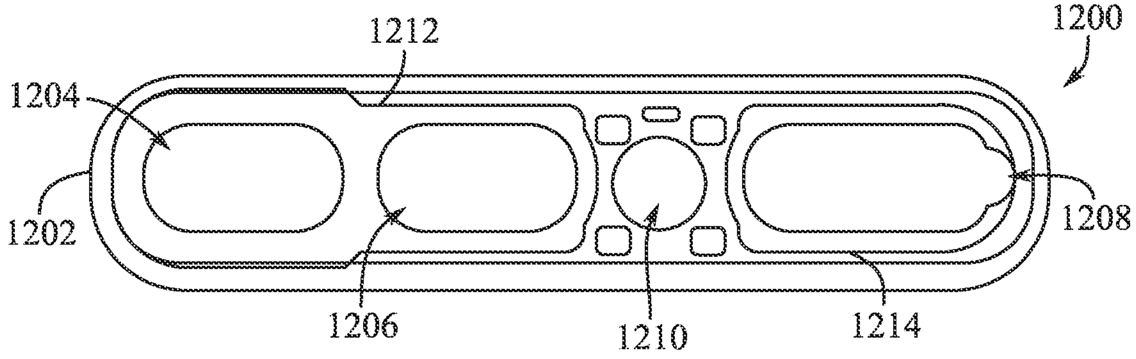

In FIG. 12B, a mesh 1212 and a mesh 1214 are positioned adjacent to the speaker frame 1200. The mesh 1212 can be positioned to cover the first opening 1204 and the second opening 1206. The mesh 1212 can extend over portions of the body portion 1202 adjacent the first opening 1204 and the second opening 1206. The mesh 1212 can have a greater height adjacent the first opening 1204 and a lesser height adjacent the second opening 1206. The mesh 1214 can be positioned to cover the third opening 1208. The mesh 1214 can extend over portions of the body portion 1202 adjacent the third opening 1208. In some examples, an edge of the mesh 1214 can be aligned with an edge of the semi-circular bump-out of the third speaker opening 1208; however, the mesh 1214 can extend past the edge of the semi-circular bump-out of the third speaker opening 1208. The mesh 1212 can have a shape similar to the first opening 1204 and the second opening 1206, and the mesh 1214 can have a shape similar to the third opening 1208. The meshes 1212, 1214 can be provided to protect speakers disposed adjacent the first opening 1204, the second opening 1206, and/or the third opening 1208. The meshes 1212, 1214 can have pore sizes identified and selected to balance resistance to ingress of foreign materials, cosmetic benefits, water ejection, and acoustic performance. In some examples, the meshes 1212, 1214 can have pore sizes from about 10 μm to about 100 μm, from about 1 μm to about 1,000 μm, or the like. The meshes 1212, 1214 can be formed from metals, fabrics, polymers, the like, or a combination thereof.

Figure 12C:
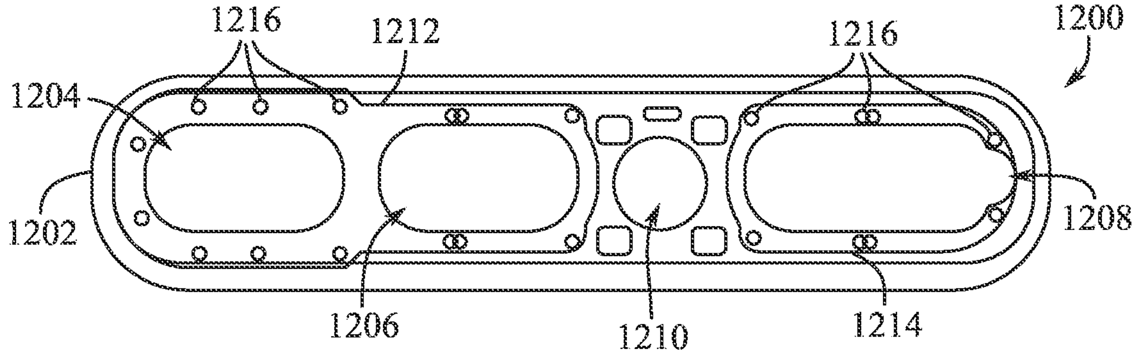

In FIG. 12C, welds 1216 are formed within the perimeters of the meshes 1212, 1214 and the body portion 1202 of the speaker frame 1200 to attach the meshes 1212, 1214 to the body portion 1202 of the speaker frame 1200. The welds 1216 can be disposed in positions that will be covered by the outer housing of the electronic device (illustrated in FIG. 12E), such that the welds 1216 are not visible to a user. In some embodiments, the welds 1216 can cover about 4 pores of the meshes 1212, 1214, from about 1 pore to about 10 pores, from about 1 pore to about 20 pores, or the like. In some examples, pairs of welds 1216 can be disposed adjacent to one another, and can have various configurations, such as being horizontal pairs, vertical pairs, diagonal pairs, or the like. The welds 1216 can have diameters from about 0.3 mm to about 0.4 mm, from about 0.1 mm to about 1 mm, from about 25 μm to about 1 mm, or the like.

Figure 12D:
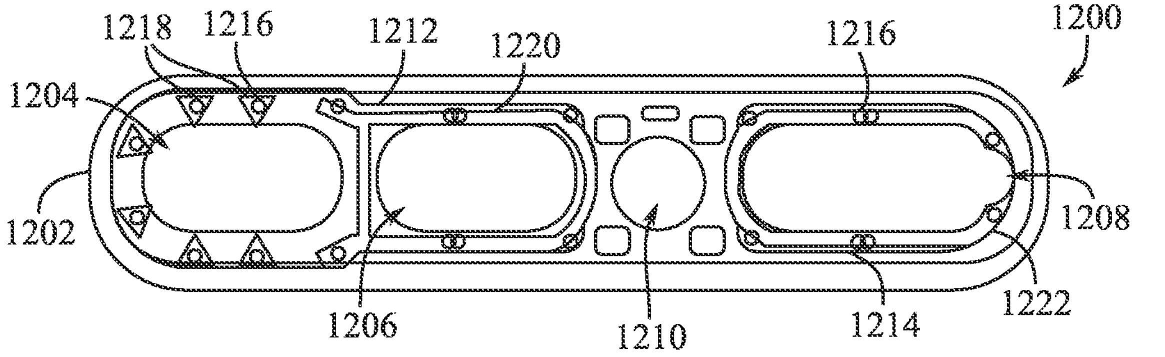

In FIG. 12D, adhesives 1218, 1220, and 1222 are deposited over the welds 1216 to further attach the meshes 1212, 1214 to the body portion 1202 of the speaker frame 1200. The adhesives 1218, 1220, 1222 can be disposed in positions that will be covered by the outer housing of the electronic device (illustrated in FIG. 12E), such that the adhesives 1218, 1220, 1222 are not visible to a user. As illustrated in FIG. 12D, separate quantities of the adhesive 1218 can be deposited on the welds 1216 adjacent the first opening 1204. Each quantity of the adhesive 1218 can be deposited over one or more of the welds 1216, such as two adjacent welds 1216. The adhesive 1218 is illustrated as including triangular-shaped quantities, however, the quantities of the adhesive 1218 can have any suitable shape, such as circular, rounded, square, or the like. A continuous quantity of the adhesive 1220 can be deposited on the welds 1216 adjacent the second opening 1206. The adhesive 1220 can be generally D-shaped with tails at the top and bottom. The adhesive 1220 can surround or encircle the second opening 1206. A continuous quantity of the adhesive 1222 can be deposited on the welds 1216 adjacent the third opening 1208. The adhesive 1222 can be generally C-shaped. The adhesive 1222 can surround at least three sides of the third opening 1208. The configurations of the adhesives 1218, 1220, 1222 can be dependent upon shapes of openings in the outer housing of the electronic device that will be disposed adjacent the adhesives 1218, 1220, 1222, such that the adhesives 1218, 1220, 1222 are hidden from view by the outer housing of the electronic device. Each of the adhesives 1218, 1220, 1222 can cover one or more of the welds 1216. In some examples, separate quantities of the adhesives 1220 and/or 1222 can be disposed adjacent the second opening 1206 and/or the third opening 1208, respectively. In some examples, a continuous quantity of the adhesive 1218 can be disposed adjacent the first opening 1204. The adhesives 1218, 1220, 1222 can have greater diameters or other measurements than the welds 1216, such that the adhesives 1218, 1220, 1222 cover or otherwise surround the welds 1216.

The adhesives 1218, 1220, 1222 can include epoxies, hot melts, pressure-sensitive adhesives, heat-activated film adhesives, ultra-violet (UV)-cured adhesives, combinations thereof, or the like. The adhesives 1218, 1220, 1222 can be formed of materials having a greater elasticity than materials of the welds 1216. Including the adhesives 1218, 1220, 1222 in addition to the welds 1216 can allow for some flexing and/or movement of the meshes 1212, 1214 relative to the speaker frame 1200, without the meshes 1212, 1214 becoming detached from or otherwise tearing away from the speaker frame 1200. As illustrated in FIG. 12D, the adhesives 1218, 1220, 1222 can have areas larger than areas of the welds 1216, which engages additional filaments of the meshes 1212, 1214. In cases of impacts to the meshes 1212, 1214, this spreads forces across a greater area of the meshes 1212, 1214, and helps decrease damage to the meshes 1212, 1214, detachment or tearing away from the speaker frame 1200, and the like. In some examples, a ratio of the area of the adhesives 1218, 1220, 1222 to the underlying welds 1216 can range from about 1.5 to about 4, from about 2 to about 10, from about 1.5 to about 100, from about 4 to about 200, or the like.

Figure 12E:
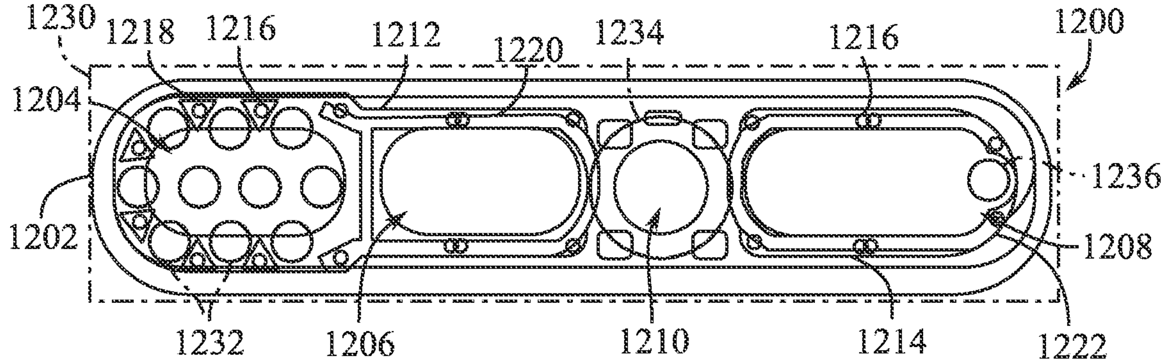

In FIG. 12E, the speaker frame 1200 is attached to an outer housing 1230 of an electronic device. FIG. 12E illustrates an outer housing 1230 that may be a sidewall, a portion of a sidewall, or another portion of an outer housing of an electronic device. The electronic device can be the same as or similar to any of the electronic devices discussed above. The outer housing 1230 can include first speaker openings 1232, a second speaker opening 1236, and a button 1234. The first speaker openings 1232 can include a plurality of circular openings. Although the first speaker openings 1232 are illustrated as including ten circular openings, any number of openings, such as more or less openings, can be provided. The first speaker openings 1232 can at least partially overlap, or at least some of the first speaker openings 1232 can at least partially overlap the first speaker opening 1204. The second speaker opening 1236 can be circular. The second speaker opening 1236 can be disposed within an area of the third speaker opening 1208. The second speaker opening 1236 can be disposed within an area of the semi-circular bump-out of the third speaker opening 1208. The semi-circular bump-out of the third speaker opening 1208 can be provided to provide a channel from a speaker disposed adjacent to the third speaker opening 1208 to an external environment. The button 1234 can be the same as or similar to the button 1008, discussed above with respect to FIGS. 10A through 10L, and can extend through at least one of the button openings 1210. In some examples, the first speaker openings 1232 can correspond to the second speaker vent 247, the second speaker opening 1236 can correspond to the first speaker vent 249, and the button 1234 can correspond to the button 208 discussed above with respect to FIG. 2B. In some examples, the first speaker openings 1232 can correspond to the second vent 1047, the second speaker opening 1236 can correspond to the first vent 1049, and the button 1234 can correspond to the button 1008 discussed above with respect to FIGS. 10A through 10L.

As illustrated in FIG. 12E, the adhesives 1218, 1220, 1222 and the welds 1216 can be disposed outside of the first speaker openings 1232 and the second speaker opening 1236 of the outer housing 1230. This prevents the adhesives 1218, 1220, 1222 and the welds 1216 from being visible to a user of the electronic device, and improves the aesthetics of the electronic device. Including the adhesives 1218, 1220, 1222 in addition to the welds 1216 increases an area of attachment between the meshes 1212, 1214 and the speaker frame 1200, which improves attachment between the meshes 1212, 1214 and the speaker frame 1200, spreads forces from impacts across a larger area, and improves resistance of the electronic device to damage. Moreover, the adhesives 1218, 1220, 1222 can be formed of relatively flexible, elastic materials compared to the welds 1216, which further improves resistance of the meshes 1212, 1214 and the speaker frame 1200 from detachment, tearing, and the like.

In some examples, the speaker frame 1200 can be configured similar to or the same as the speaker frame 1100*b* illustrated in FIG. 11B. In such examples, the first speaker opening 1204 can include a plurality of circular openings, which can each correspond to a respective opening of the first speaker openings 1232 of the outer housing 1230 of the electronic device. This can increase support for the mesh 1212 by the speaker frame 1200, and improve damage and detachment resistance of the mesh 1212.

Figure 12F:
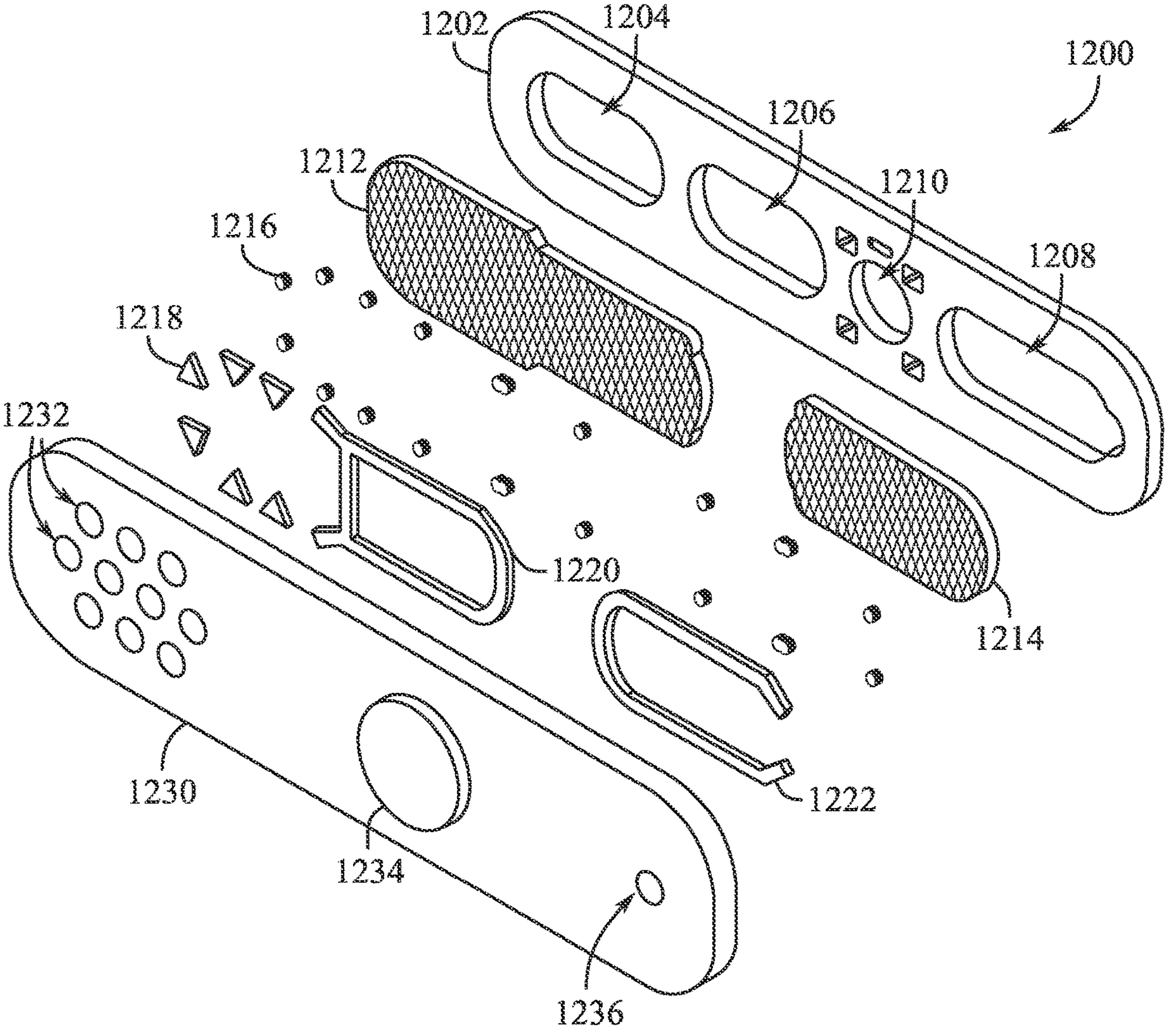
FIG. 12F is an exploded view of the mesh, speaker frame, and housing assembly of FIG. 12E.

FIG. 12F illustrates an exploded perspective view of the speaker frame 1200, the meshes 1212, 1214, the welds 1216, the adhesives 1218, 1220, 1222, and the outer housing 1230. The mesh 1214 can be attached to the speaker frame 1200 covering the first speaker frame 1204 and the second speaker frame 1206 and the mesh 1214 can be attached to the speaker frame 1200 covering the third speaker frame 1208. The meshes 1212, 1214 can be attached to the speaker frame 1200 by the welds 1216 and the adhesives 1218, 1220, 1222 covering the welds 1216. The speaker frame 1200 can then be attached to the outer housing 1230, with the meshes 1212, 1214, the welds 1216, and the adhesives 1218, 1220, 1222 being disposed therebetween.

Figure 13A:
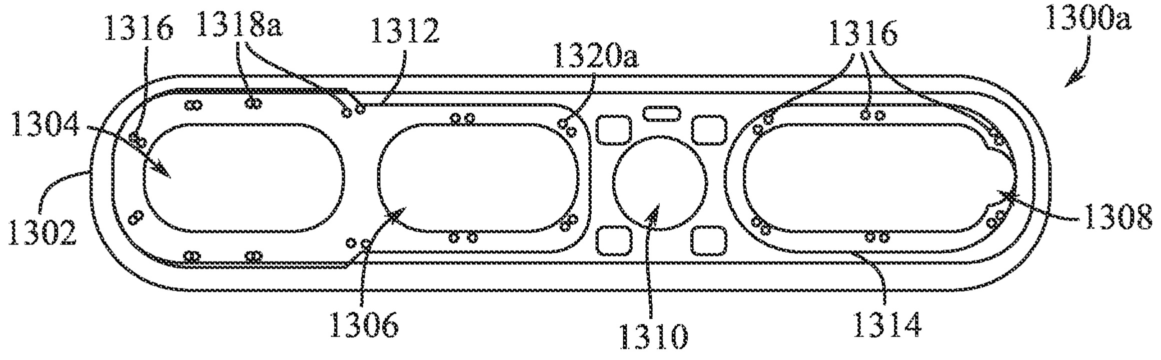
FIGS. 13A and 13B are front views of mesh attached to a speaker frames with different weld patterns.
Figure 13B:
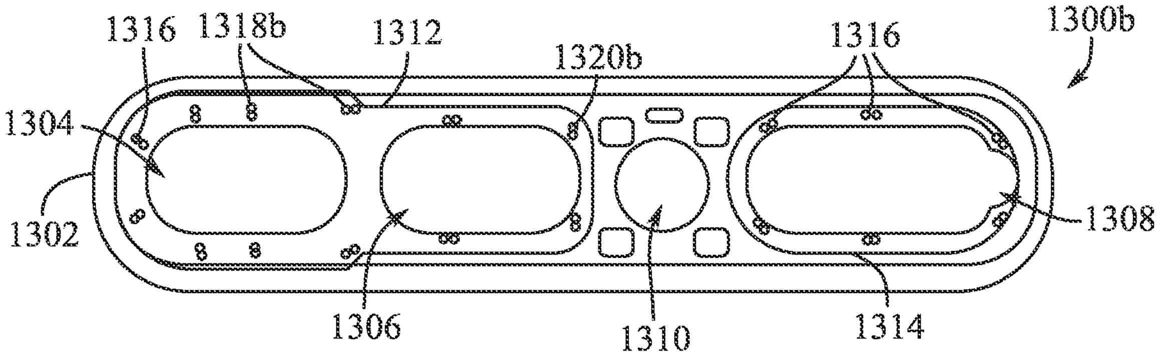

FIGS. 13A and 13B illustrate speaker frames 1300*a* and 1300*b* that include varying configurations of welds 1316, 1318*a*, 1318*b*, 1320*a*, and 1320*b* used to attach meshes 1312 and 1314 to body portions 1302 of the speaker frames 1300*a*, 1300*b*. The speaker frames 1300*a*, 1300*b* can include first speaker openings 1304, second speaker openings 1306, third speaker openings 1308, and button openings 1310 extending through the body portions 1302. The speaker frame 1300 can be the same as or similar to the speaker frame 1100*a* discussed above with respect to FIG. 11A. In the example of FIG. 13A, pairs of the welds 1318*a* disposed adjacent the first speaker opening 1304 are arranged horizontally next to one another. In the example of FIG. 13B, pairs of the welds 1318*b* disposed adjacent the first speaker opening 1304 are arranged vertically next to one another. Providing the vertical welds 1318*b* of the example of FIG. 13B can reduce visibility of the welds 1318*b* through an outer housing relative to the welds 1318*a* of example 13A. In the example of FIG. 13A, pairs of the welds 1320*a* disposed adjacent the second speaker opening 1306 are arranged diagonally next to one another. In the example of FIG. 13B, pairs of the welds 1320*b* disposed adjacent the second speaker opening 1306 are arranged vertically next to one another. Providing the angled welds 1320*a* of the example of FIG. 13A can reduce visibility of the welds 1320*a* through an outer housing relative to the welds 1320*b* of example 13B.

Any of the features, components, and/or parts, including the arrangements and configurations thereof shown in FIGS. 11A through 13B can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 11A through 13B.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:

a housing sidewall defining an opening;

an electronic positioned adjacent to the opening; and a seal between the electronic and the opening, the seal comprising:

a perforated support;

a first adhesive layer on the perforated support;

a first membrane layer on the first adhesive layer, wherein the first adhesive layer defines a slot extending in a direction parallel to a longitudinal axis of the first adhesive layer;

a second adhesive layer on the first membrane layer; and a second membrane layer on the second adhesive layer, wherein the second adhesive layer defines a slot extending in a direction parallel to a longitudinal axis of the second adhesive layer.

2. The electronic device of claim 1, further comprising:

a third adhesive layer on the second membrane layer; and a third membrane layer on the third adhesive layer.

3. The electronic device of claim 2, wherein:

the first membrane layer has a waterproof rating of at least 10 bar;

the second membrane layer has a waterproof rating of at least 10 bar; and the third membrane layer has a waterproof rating of at least 5 bar and less than the waterproof rating of each of the first membrane layer and the second membrane layer.

4. The electronic device of claim 3, wherein the third membrane layer has a thickness greater than a thickness of each of the first membrane layer and the second membrane layer.

5. The electronic device of claim 1, wherein:

the first membrane layer has a waterproof rating of at least 10 bar; and the second membrane layer has a waterproof rating of at least 5 bar and less than the waterproof rating of the first membrane layer.

6. The electronic device of claim 5, wherein the second membrane layer has a thickness greater than a thickness of the first membrane layer.

7. The electronic device of claim 1, wherein:

the first membrane layer has a waterproof rating of at least 10 bar;

the second membrane layer has a waterproof rating of at least 10 bar; and the first membrane layer and the second membrane layer have the same thicknesses.

8. A seal comprising:

a perforated support;

a first adhesive layer on the perforated support;

a first membrane layer, having a waterproof rating of at least 10 bar, on the first adhesive layer;

a second adhesive layer on the first membrane layer; and a second membrane layer, having a waterproof rating of at least 5 bar and less than the waterproof rating of the first membrane layer, on the second adhesive layer.

9. The seal of claim 8, further comprising:

a third adhesive layer on the second membrane layer; and a third membrane layer on the third adhesive layer.

10. The seal of claim 9, wherein the third membrane layer has a waterproof rating of at least 5 bar.

11. The seal of claim 10, wherein the third membrane layer has a thickness greater than a thickness of each of the first membrane layer and the second membrane layer.

12. The seal of claim 8, wherein:

the first adhesive defines a slot extending in a direction parallel to a longitudinal axis of the first adhesive; and the second adhesive defines a slot extending in a direction parallel to a longitudinal axis of the second adhesive.

13. The seal of claim 8, wherein the second membrane layer has a thickness greater than a thickness of the first membrane layer.

14. The seal of claim 8, wherein the first membrane layer and the second membrane layer have a same thickness.

15. A housing comprising:

a sidewall defining an internal volume and an opening to the internal volume; and a seal on the opening, the seal comprising:

a perforated support;

a first adhesive layer on the perforated support;

a first membrane layer, having a waterproof rating of at least 10 bar, on the first adhesive layer;

a second adhesive layer on the first membrane layer; and a second membrane layer, having a waterproof rating of at least 10 bar, on the second adhesive layer, wherein the first membrane layer and the second membrane layer have a same thickness.

16. The housing of claim 15, further comprising:

a third adhesive layer on the second membrane layer; and a third membrane layer on the third adhesive layer.

17. The housing of claim 16, wherein the third membrane layer has a waterproof rating of at least 5 bar and less than the waterproof rating of each of the first membrane layer and the second membrane layer.

18. The housing of claim 17, wherein the third membrane layer has a thickness greater than the thickness of each of the first membrane layer and the second membrane layer.

19. The housing of claim 15, wherein:

the first adhesive defines a slot extending in a direction parallel to a longitudinal axis of the first adhesive; and the second adhesive defines a slot extending in a direction parallel to a longitudinal axis of the second adhesive.

* * * * *